(12) United States Patent
Malavade et al.

(10) Patent No.: US 11,782,983 B1
(45) Date of Patent: Oct. 10, 2023

(54) EXPANDED CHARACTER ENCODING TO ENHANCE REGULAR EXPRESSION FILTER CAPABILITIES

(71) Applicant: Amazon Technologies, Inc., Seattle, WA (US)

(72) Inventors: Pritish Pravin Malavade, San Jose, CA (US); Nigel Antoine Gulstone, San Jose, CA (US); Kalaiselvi Kamaraj, Foster City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 17/106,010

(22) Filed: Nov. 27, 2020

(51) Int. Cl.
*G06F 16/00* (2019.01)
*G06F 16/9032* (2019.01)
*G06F 16/9035* (2019.01)
*G06F 16/30* (2019.01)

(52) U.S. Cl.
CPC .... *G06F 16/90324* (2019.01); *G06F 16/9035* (2019.01)

(58) Field of Classification Search
None
See application file for complete search history.

(56) References Cited

U.S. PATENT DOCUMENTS

| | | | | |
|---|---|---|---|---|
| 6,018,735 A * | 1/2000 | Hunter | ............... | G06F 16/90344 707/999.005 |
| 8,086,554 B1 * | 12/2011 | Steele | ............... | G06F 16/90339 706/48 |
| 8,938,454 B2 * | 1/2015 | Chao | ............... | G06F 16/90344 707/803 |
| 8,943,063 B2 * | 1/2015 | Chao | ............ | H04L 41/16 707/803 |
| 8,964,548 B1 * | 2/2015 | Keralapura | ........... | H04L 43/026 370/235 |
| 10,885,192 B2 * | 1/2021 | Bakthavatchalam | ........ | H04L 63/145 |
| 10,990,627 B1 * | 4/2021 | Gulstone | ............. | G06F 16/9035 |
| 2003/0195874 A1 * | 10/2003 | Akaboshi | ........... | G06F 16/90344 |
| 2003/0229852 A1 * | 12/2003 | Uramoto | ............... | G06F 40/143 715/237 |
| 2004/0172234 A1 * | 9/2004 | Dapp | ................ | G06F 8/427 704/1 |

(Continued)

OTHER PUBLICATIONS

Pao, Derek, Nga Lam Or, and Ray CC Cheung. "A memory-based NFA regular expression match engine for signature-based intrusion detection." Computer communications 36.10-11 (2013): 1255-1267. (Year: 2013).*

(Continued)

*Primary Examiner* — Polina G Peach
(74) *Attorney, Agent, or Firm* — S. Scott Foster; Kowert, Hood, Munyon, Rankin & Goetzel, P.C.

(57) ABSTRACT

Expanded encoding may be implemented to enhance regular expression filter capabilities. Two or more adjacent characters in a stream of characters to be processed by a regular expression filter may be recognized and replaced with a symbol. The symbol may be used instead of the two or more adjacent characters for processing through non-deterministic finite automaton (NFA) states. The output of the NFA states may indicate whether a match for a regular expression is present in the stream of characters.

20 Claims, 13 Drawing Sheets

(56) References Cited

U.S. PATENT DOCUMENTS

| | | | |
|---|---|---|---|
| 2005/0012521 A1* | 1/2005 | Sharangpani | G06F 16/90344 326/46 |
| 2006/0004744 A1* | 1/2006 | Nevidomski | G06F 16/90344 |
| 2006/0020595 A1* | 1/2006 | Norton | G06F 16/90344 |
| 2006/0136570 A1* | 6/2006 | Pandya | H04L 69/16 709/217 |
| 2008/0109431 A1* | 5/2008 | Kori | G06F 16/90344 |
| 2009/0106183 A1* | 4/2009 | Estan | H04L 63/1416 706/48 |
| 2011/0145181 A1* | 6/2011 | Pandya | G06F 16/90344 706/27 |
| 2011/0167030 A1* | 7/2011 | Bremler-Barr | G06N 5/003 706/48 |
| 2013/0133064 A1* | 5/2013 | Goyal | H04L 63/1408 726/22 |
| 2013/0290356 A1* | 10/2013 | Yang | G06F 16/90344 707/755 |
| 2014/0143195 A1* | 5/2014 | Ruehle | G06N 5/02 706/46 |
| 2014/0208076 A1* | 7/2014 | Ruehle | H04L 63/0245 712/220 |
| 2015/0067836 A1* | 3/2015 | Billa | H04L 41/28 726/22 |
| 2015/0355891 A1* | 12/2015 | Angerer | G06F 17/00 717/151 |
| 2016/0028766 A1* | 1/2016 | Valgenti | H04L 63/1425 726/23 |
| 2016/0267142 A1* | 9/2016 | Cafarella | G06F 16/90344 |
| 2021/0157858 A1* | 5/2021 | Stevens | G06F 16/24568 |

OTHER PUBLICATIONS

Yang, Yi-Hua, and Viktor Prasanna. "High-performance and compact architecture for regular expression matching on FPGA." IEEE Transactions on Computers 61.7 (Jul. 2012 1013): 1013-1025. (Year: 2012).*

Yusaku Kaneta, et al., "High-speed String and Regular Expression Matching on FPGA," APSIPA ASC 2011 Xi'an, pp. 1-7.

Reetinder Sidhu, et al., "Fast Regular Expression Matching using FPGAs," The 9th Annual IEEE Symposium on Field-Programmable Custom Computing Machines (FCCM'01), Apr. 2001, pp. 1-12.

David Sidler, et al. "Accelerating Pattern Matching Queries in Hybrid CPU-FPGA Architectures," SIGMOD'17, May 14-19, 2017, Chicago, Illinois, USA pp. 1-13.

Louis Woods, et al., "Complex Event Detection at Wire Speed with FPGAs," ACM, VLDB '10, Sep. 1317, 2010, Singapore, pp. 1-10.

* cited by examiner

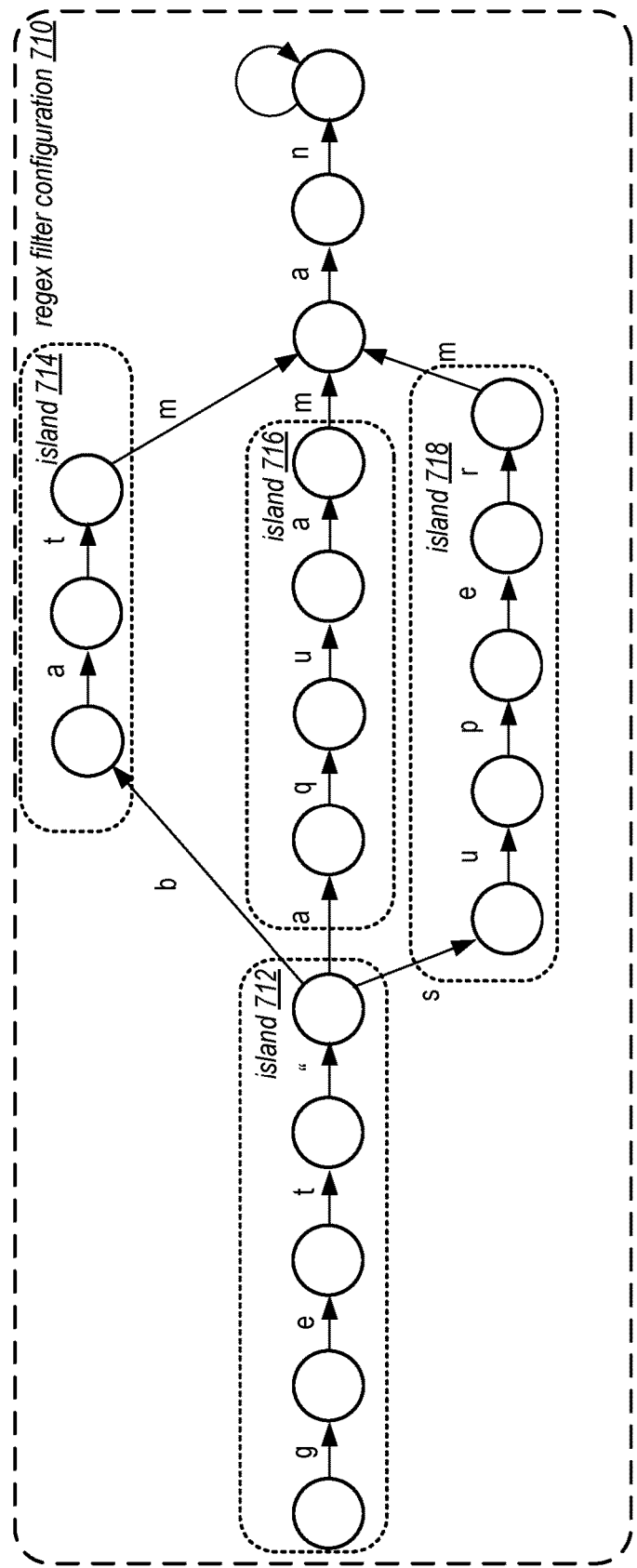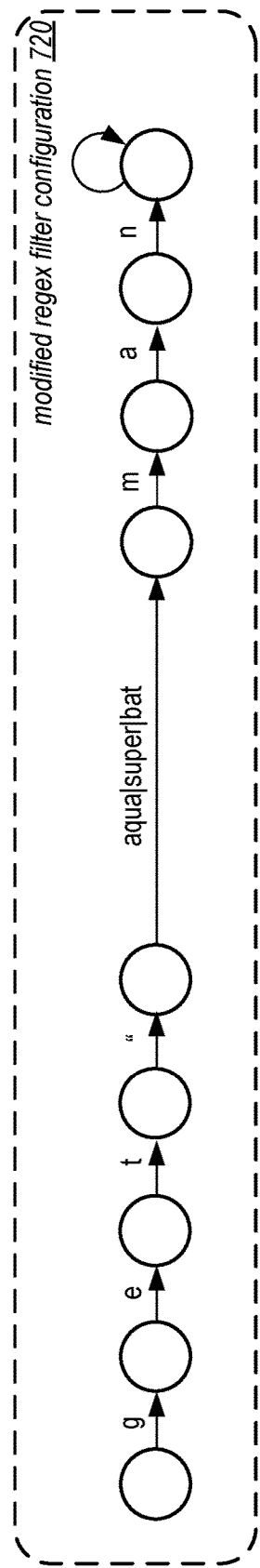
FIG. 7A
FIG. 7B

EXPANDED CHARACTER ENCODING TO ENHANCE REGULAR EXPRESSION FILTER CAPABILITIES

BACKGROUND

As the technological capacity for organizations to create, track, and retain information continues to grow, a variety of different technologies for querying data with increasing speed and efficiency continue to be developed. General purpose hardware, such as central processing units (CPUs) may execute various software applications, such as query engines for databases or other data processing platforms, and may offer many different query capabilities for searching data. While general purpose hardware offers the ability to deploy different software applications to perform queries in a variety of different contexts, performance of software applications may be limited to optimizing the design of the software applications to fit the character of the general purpose hardware. Operations performed upon dedicated circuitry, however, can optimize performance of the hardware to performance of specific operations for querying data which can achieve performance gains beyond those achievable by software applications alone.

BRIEF DESCRIPTION OF THE DRAWINGS

FIGS. 7A-7B are logical block diagrams of different versions of a regular expression filter configuration to search for a same regular expression, according to some embodiments.

Figure 1:
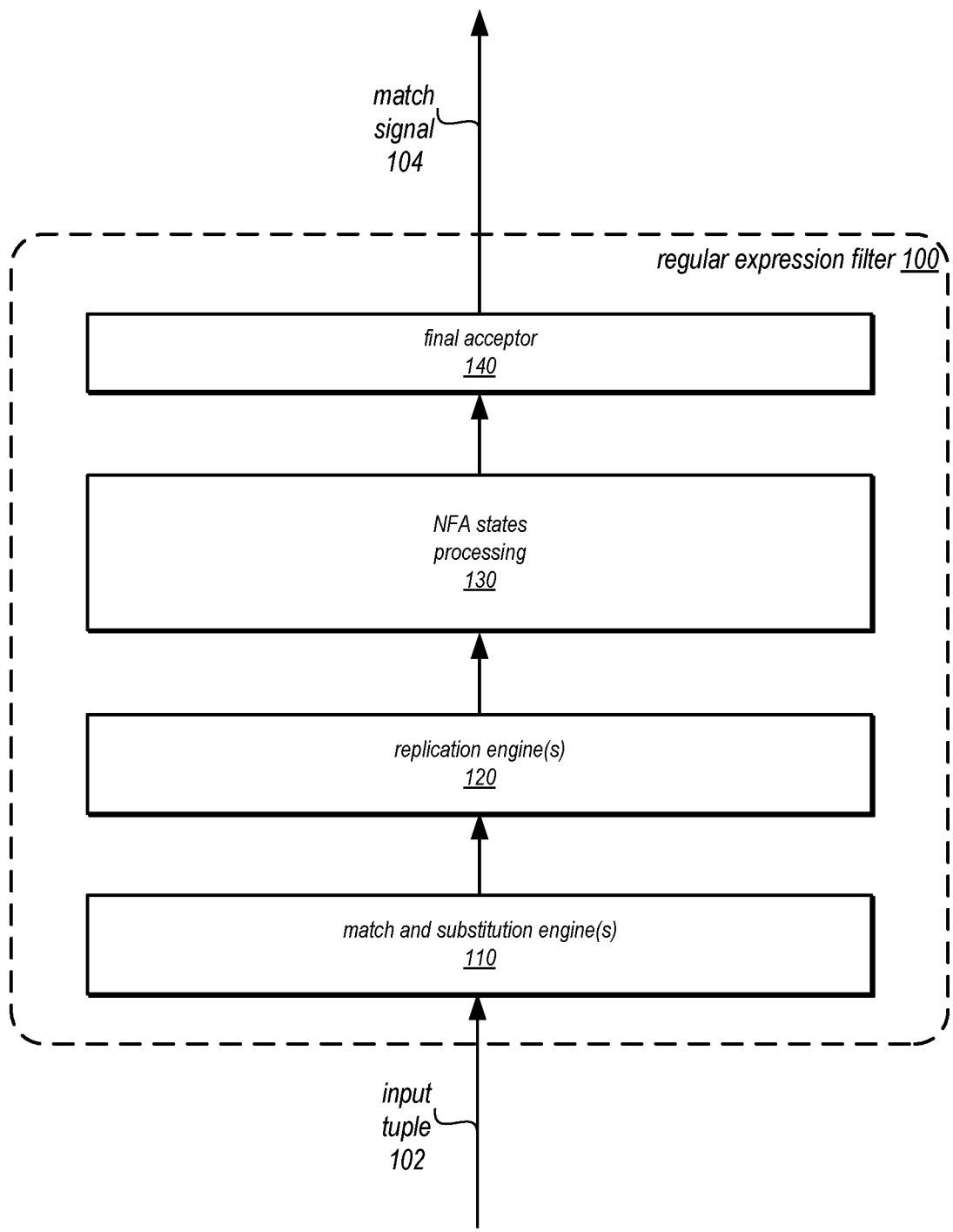
FIG. 1 is a logical block diagram of a regular expression filter that implements expanded character encoding to enhance regular expression filter capabilities, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of expanded character encoding to enhance regular expression filter capabilities are described herein. Regular expressions may, in various embodiments, provide a search pattern for identifying items in a data store (e.g., tuples, entries, rows, fields or column values, etc.) which match the pattern identified by a regular expression. Support for regular expressions can increase the flexibility and scope of queries to a data store. For example, regular expressions could be used to find data in one query that might otherwise have to be found by executing multiple queries without regular expressions.

Hardware optimized techniques may be implemented, in various embodiments, to perform regular expression matching when querying a data store. Integrated circuitry, such as a Field Programmable Gate Array (FPGA), Application Specific Integrated Circuit (ASIC), or a System-on-a-CHIP (SoC), etc., may implement hardware components (e.g., flops or other registers, lookup tables, etc.) dedicated to evaluating whether an input item of a data store matches the regular expression. When considering the design of performing regular expression matching in hardware, area, power, and support (e.g., supported features in FPGAs for example) may offer a design challenge to achieve regular expression filtering within such design considerations. Expanded character encoding may provide efficient utilization of hardware resources to satisfy area, power and/or support considerations as well as increase the support for a broader range of metacharacters (or extend the capabilities of metacharacters further), in various embodiments.

For example, implementations of regular expression search features that include "SIMILAR TO" and POSIX features may take advantage of expanded character encoding in order to enable and/or enhance support for alternations (e.g., metacharacters like "|" included regular expressions) replications (e.g., metacharacters like "{m}", which repeat the previous item exactly m times, "{m,}", which repeat the previous item m or more times, and "{m,n}"), group Kleene closures (e.g,. (abc)*), and/or any other bounded or unbounded repeats, in some embodiments. Moreover, these techniques can be used to prevent state explosions for replications and enhance the capabilities of islands of NFA states to support alternations. FIG. 1 is a logical block diagram of a regular expression filter that implements expanded character encoding to enhance regular expression filter capabilities, according to some embodiments.

Regular expression filter 100 may be implemented on dedicated circuitry like an FPGA, ASIC, as part of an SOC, or other hardware component, in various embodiments. Regular expression filter 100 may be implemented in an offload card or other enhance for a standalone and/or private data storage system (e.g., a private or on premise data warehouse system), or, as discussed in detail below with regard to FIGS. 12 and 13, as part of a service that performs and/or supports regular expression searches for a database or other data stored in a provider network. Regular expression filter 100 may take as input a stream of characters 102 from an item (e.g., tuple from a database) to be evaluated one at a time and process the stream of characters through regular expression filter 100 so that when a last character of an item is evaluated at regular expression filter 100, an match signal 104 can indicate a matching item may be provided by regular expression filer 100.

Figure 2:
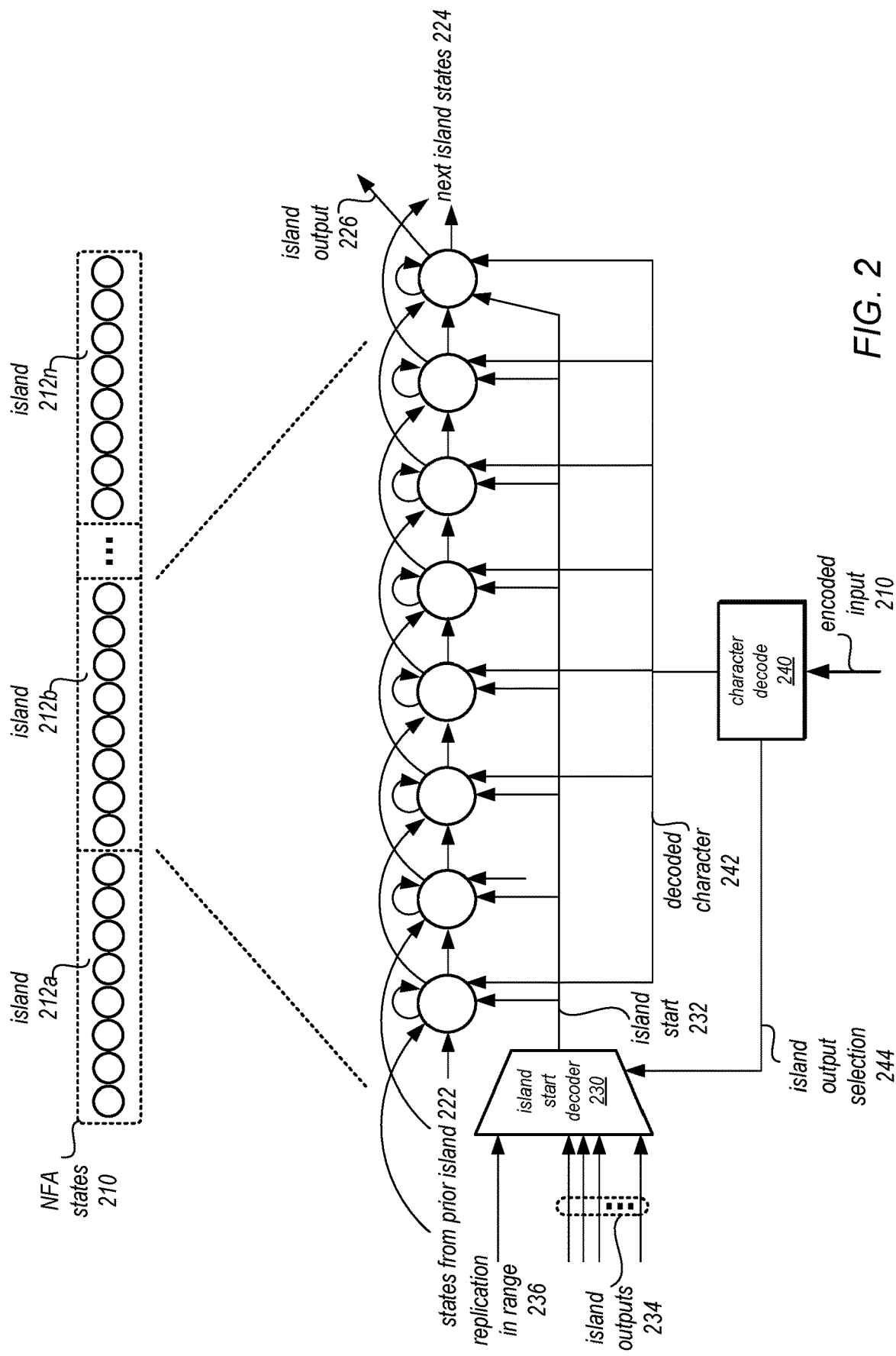
FIG. 2 is a logical block diagram illustrating islands of nondeterministic finite automaton states that support multi-character sequence alternations in a regular expression search, according to some embodiments.

Regular expression filter 100 may include a number nondeterministic finite automaton (NFA) states 130 which may be programmable to identify a match of regular expressions of varying lengths, as not all NFA states 130 need be utilized for every regular expression evaluated by regular expression filter 100. NFA states 130 may be determined for a regular expression by transforming a text string or indication of a regular expression into an NFA, which may include multiple states 130, such as the various examples discussed below with regard to FIGS. 3 and 7A-9, to be evaluated together as part of regular expression filter 100. FIG. 2, discussed in detail below, provides further discussion of the various configurations of these states to implement searches for various different regular expressions based on island topologies that group NFA states. The output of NFA states processing 130 may be interpreted by final acceptor 140, which may indicate whether an item matches the regular expression.

In various embodiments, regular expression filter 100 may implement match and substitution engine(s) 110, which may rely upon principles of homomorphism, as discussed in detail below with regard to FIGS. 5, 6, and 10, in order to replace multiple characters in a regular expression search with a single symbol using an expanded encoding (e.g., adding one or more additional bits to an 8 bit character encoding). In this way, the number of NFA states used to represent a regular expression can be reduced, expanding the capacity of the regular expression filter as a larger expression can be handled by the number of NFA states.

In various embodiments, regular expression filter 100 may implement replication engine(s) 120 either in conjunction with match and substitution engine, as illustrated in FIG. 1, or in other embodiments as part of a regular expression filter that does not implement match and substitution engine(s) 110 (not illustrated). As discussed in detail below with regard to FIGS. 3-4 and 11A-11B, replication engine(s) 120 may count the occurrences one or multiple characters that repeat in an item (e.g., bounded or unbound group repeats). In this way, repeats can be determined that satisfy the regular expression filter without increasing the number of NFA states used to detect each iteration of the one or multiple characters.

Please note that the previous description of expanded character encoding to enhance regular expression filter capabilities is a logical illustration and thus is not to be construed as limiting as to the implementation of a final acceptor, NFA states, replication engine, and/or match and substitution engine.

This specification begins with a general description of various stages of a replication filter, including islands of NFA states, a replication engine, and a matching and substitution engine. Next, the specification discusses a provider network that implements multiple different services, including data processing services and a hardware accelerated data analytics service which may implement a regular expression filter that shares character data across lookups to identify matches to a regular expression. A number of different methods and techniques to implement expanded character encoding to enhance regular expression filter capabilities are then discussed, some of which are illustrated in accompanying flowcharts. Finally, a description of an example computing system upon which the various components, modules, systems, devices, and/or nodes may be implemented is provided. Various examples are provided throughout the specification.

In various embodiments, a regular expression filter (sometimes referred to as a regex filter) may implement NFA states to detect matches of characters being processed through the regular expression filter. In at least some embodiments, a regular expression filter may process item data (e.g., a tuple or other record or portion of a record) through a parameterized state machine composed from the NFA states and configured by a given regular expression (e.g., via query or other system interface). An NFA may be represented using 5 elements (S, $\Sigma$, $\delta$, s0, A), wherein S is a finite set of states, $\Sigma$ is a finite set of input symbols, $\delta$ is a transition function, s0 is a start state, and A is a set of states identified as accepting state where $A \subseteq S$, in some embodiments. In order to support alternations and other regular expression features, islands of NFA of adjacent NFA states may be used. For example, an island (I) may be described as a group of states where $I \subseteq S$, where $S=\{I_0, I_1, \ldots I_n\} | I_0 \cap I_1 \cap \ldots \cap I_n = \emptyset$. FIG. 2 is a logical block diagram illustrating islands of nondeterministic finite automaton states that support multi-character sequence alternations in a regular expression search, according to some embodiments. In various embodiments, the use of islands in a regular expression filter may be enabled or disabled by setting one or more regular expression filter settings (which may instead utilize the NFA states as a chain without island features discussed below).

In FIG. 2, each NFA state, illustrated by a circle, may be logically described as a regular expression state chain, as indicated at 210. NFA states may be grouped into different islands, such as islands 212a, 212b, and 212n. The output of individual states of one island may be provided to the next island chain, as indicated at 222 and 224. The output of the island as a whole, as indicated at 226, may be provided via one of the NFA states in the island (e.g., the last NFA state in the island). Although in the illustration, equal numbers of NFA states are included in each island, in some embodiments, islands in a regular expression filter may have different numbers (e.g., where larger islands are located at the beginning of a regular expression state chain). In various embodiments, a NFA state may be implemented using a character decode stage, such as character decode 240, which may decode the encoded input 210 of a character (e.g., a 9-bit symbol provided by match and substitution engine 110 and/or a replication engine 120, according to which of these stages are enabled. Character decode 240 may, in some embodiments, take in a 9-bit symbol per cycle and produce a single bit character decode output for each state. Character decode 240 may be implemented as Block Random Access Memory (BRAM), in some embodiments, to provide a lookup table that can be programmed in order to filter for the given regular expression. NFA states may also include a stage register (not illustrated), which may store the output indication of the individual state, as the state machine implemented by the NFA states may be a 1-hot state machine that allows for multiple states to be active at the same time (e.g., more than one NFA state can signal a "1" indication, which final acceptor 140 can use based on the output signals of multiple NFA states to determine whether a match for the regular expression has been found).

Each NFA state may also include a next state lookup table, which may determine a next state value based on five inputs, in some embodiments. For example, as illustrated in FIG. 2, each of the circle states has 5 input arrows, described below:

One input arrow is a loop back to the same state, which indicates that one of the inputs to the lookup table for a state is the output of that state (e.g., provided via that NFA state's state register), which can be used for implementing self loops.

Another input is the output of the decoder (e.g., decoder 240), to respond to the character input. In some embodiments, at the final state of the island, the character decode signal may be combined with a repeat done signal (e.g., provided via a replication engine encoding as discussed below). For example, the repeat done signal may occur when a counter in a replication engine whose increment and reset signal are tied to Lookup Tables (LUT) that have the same inputs as a typical next state LUT. This may allow the counter to be used to apply count-based conditions to the last state to implement replication.

Another input may be an island start signal 232. The island start signal may allow islands to optionally respond to the final state of any of the other islands being reached in a regular expression filter configuration, as discussed in detail below.

Another input may be a previous two state signal, which may allow an NFA state to be conditioned based on the state prior to the immediately prior state (as illustrated by the input arrow that skips over one NFA state).

Another input may be a previous state signal, which may allow the state to be conditioned based on the state before (as illustrated by the input arrow from one state to the next adjacent state).

According to the inputs described above, each NFA state can have optional edges which can be programmed to implement a regular expression filter configuration to search for a regular expression, in some embodiments. Each input can be programmed to be enabled or disabled, in some embodiments. Enabled inputs may be qualified by the arrival of an encoded input 210 (e.g., a 9-bit symbol). As noted above, the encoded input 210 may be provided via match and substitution engine 110 and/or replication engine 120, in some embodiments. An incoming 8-bit character, for example, may be processed through match and substation engine 110 to produce a 9-bit encoding. In some embodiments, the 9-bit encoding can then pass through replication engine 120 that compresses replication into 2 states (if needed). In some embodiments, the character decode 240 can be programmed with a set of characters or symbols to qualify all edges to the state, except island inputs. Instead, each island input can be individually qualified by its own set of characters or symbols. The island inputs come from the other islands, and the island's own island input, in some embodiments. In some embodiments, any state can be set so it indicates a match if it is high at the end of the tuple. And, as noted above, the chain can be programmed to be in any or all states after reset, in some embodiments.

As noted above, one of the inputs to NFA states may be an island start signal 232 input. Island start signal may be determined using an island start decoder 230, which may receive the island outputs 234 (from other islands like island 212a and 212n, as the output of itself, island output 226 from island 212b). In some embodiments, island start decoder 230 may only provide an island start signal when enabled (e.g., via one or more regular expression configuration settings programmed by a controller). Island start decoder 230 may combine island output 234 from selected regex state bits with selected configuration decode outputs so that qualified edges from island output states can be created to groups of states in other islands (e.g., the decoder 230 can provide one island's output 234 to one or more of the NFA states in island 212b as indicated by the input arrows). As islands are groups of states, each island may have a corresponding number of bits (e.g., an island number n with 12 states may have an island group number that starts at bit n*12+0 and end at n*12+11), which island start decoder 230 may use as entries in a lookup table to determine which island output to provide as island start signal 232 based on island output selection 244 from character decode 240. In at least some embodiments, island start decoder 230 may implement multiplexers to "jump-in" and "jump-out" so that any state of an island can be the entry point into the island, whereas the last state of the island may be the exit/output state. For example, jump-in and jump-out multiplexers may add the ability to have a selectable non-last state and add the ability to enter the island at the first state from previous islands in the chain (e.g., 4 previous islands) or from its own jump out state. In some embodiments, jump out states are selected from a number of states (e.g., the first 5 even numbered states in the island). In this scheme, the 'previous state' input on the next state LUT may be for the first state of the island, in some embodiments. Jump-in and jump-out features may be enabled or disabled according to regular expression filter settings as programmed by a controller, in some embodiments.

In various embodiments, a final acceptor (e.g., like final acceptor 140 in FIG. 1), may be a wide OR block with a programmable mask. States that can trigger a match by being high (in the state register) at the end of a tuple are OR'd, while the remaining bits are ignored by the mask. After each tuple, the state bits may be reset to 0 to process the next tuple. In some embodiments, a programmable initial state may be used for the filter. In such cases, 0 may be treated as the initial value, and the next state logic for the states may be inverted that consume the state bit output as needed to treat 0 as the initial value.

Figure 3:
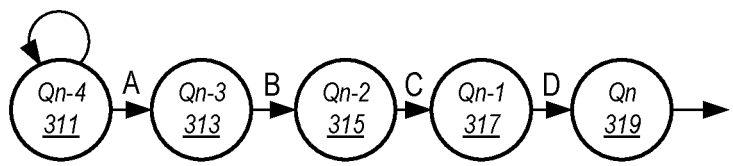
FIG. 3 is a logical block diagram of an example regular expression filter configuration, according to some embodiments.

As discussed above, regular expression filter capabilities may be expanded to support metacharacters with repeats (e.g., bounded or unbounded group repeats) using a replication engine. FIG. 3 is a logical block diagram of an example regular expression filter configuration, according to some embodiments. In FIG. 3, a configuration for a regular expression "(abcd)" that may be repeated i times would require entering state 311 (and then preceding through the other states 313, 315, 317, and 319) 4 cycles after it was last entered. In other words, if a group of characters has a length m then for it to be a repeating pattern it must enter the first state every m characters processed. As long as it is in this repeating patter, the number of times it reaches the first state (e.g., 311) can be counted. This count can then be compared against the configured number of times for the group of characters (or single character) to be repeated to determine if the incoming sequence of characters can be accepted or allowed to move into the next state. Replication engines, as discussed below, can count or track information like this in order to determine whether a repeat condition in a regular expression has been satisfied.

Figure 4A:
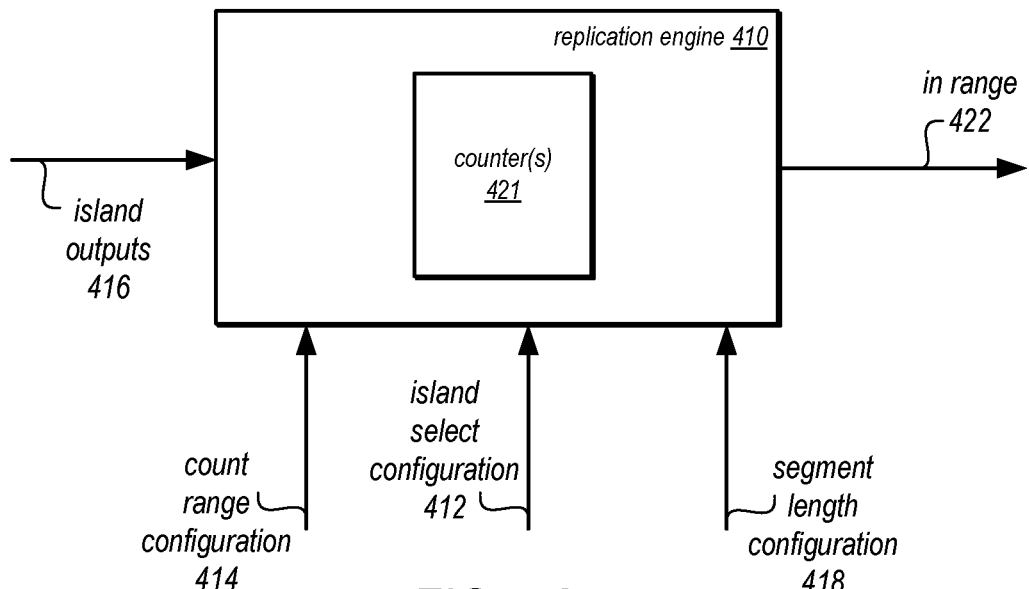
FIGS. 4A-4B are logical block diagrams illustrating examples of replication engines to support replications in a regular expression search, according to some embodiments.

FIG. 4A is a logical block diagram illustrating an example of replication engine to support replications in a regular expression search, according to some embodiments. Replication engine 410, which may be implemented in a regular expression filter as discussed above with regard to FIG. 1, may include configurable blocks that maintain a history of past events and generate an output indicating that specific run of Σ matches a repeat pattern. In various embodiments, replication engines 410 may take as input: (a) last states of all islands, as indicated by island outputs 416, (b) a corresponding segment length configuration 418, which indicates the segment length mapped to each island, (c) an island selection configuration 412 which may provide a bitmask configuration to convey which islands participate in replication, and (d) a count range configuration 414, which may indicate which convey the values used to determine if a sequence matches a repeat (e.g., "{m,n}" or "{m,}"), in some embodiments.

Replication engine 410 may implement multiple counters 421, in some embodiments, to maintain a history of state transition events and the period of particular events. For example, one counter ("Counter C") may track the number of cycles since any of the participating islands reach its last state. Another counter ("Counter R") may track the number of times one or a group of characters as indicated by an island's final state output has repeated successfully (e.g., using a pushdown automata, like a stack, to track the number of times). Counter R may be compared against the configured range values 414 (e.g., m and n) and if it lies within those bounds output in_range as set (e.g., "1"), as indicated at 422. Replication engine 410 may, in some embodiments, assume that each different segment (e.g., "abcd" "efgh" "ijkl", etc.) is implemented on a different island and end on the last state of the island. According to this assumption, the in_range signals can be merged with the island start signal decoder, as indicated at 236 in FIG. 2 and jump into the states that follow the replicated group. For example, a tree structure of lookup tables may be implemented in island start decoder 230 to incorporate the replication in range signals 236 (from one or more different repeated segments being evaluated, like in range signal 422) so that the island start signal 232 can indicate when a tuple has satisfied the repeat feature in one island as part of the evaluation of the tuple in another island.

In some embodiments, Counter C may be replaced by storing an index of the incoming character that caused the given island to reach its last state. The character index may be the count of number of characters received since the start of the tuple (e.g., stored_index−current_index). The character index may be used, in such embodiments, to return the start/end locations of a match in the tuple.

In some embodiments, additional history or observation points can be implemented as part of a replication engine 410 in order to support a combination of a Kleene start "*", alternations, and repeats. For example, a regular expression "[segment_r1].*[segment_r2]|[segment_r3]{m,}" may include additional observations, such as "island type." The below pseudo-code provides an example of incorporating these additions to handle the example regular expression:

```
input isl_type[num_isl] ;       //island type :
                                //0 = island with fixed string
                                //1 = island with *,+ or %
input q[num_isl];               //Last states of all islands
input s[num_isl];               //First active state in an island
input seg_len_cfg[num_isl];     //Segment length of each island.
                                //For type 1 island this is length
                                //till *,+ or %
input isl_sel_cfg[num_isl];     //Identify islands tied to
                                //this Replication Engine
input cntR_cfg;                 //range_min, range_max
input cntC_cfg;                 // max_count
    for (i=0; i<num_isl;i++) {
        q_val[i] = q[i] & isl_sel_cfg[i];
        s_val[i] = s[i] & isl_sel_cfg[i];
        len_match[i] = (seg_leg_cfg[i] == counterC);
        restartR1 |= (q_val[i] & ~len_match[i] & ~isl_type[i]);
        restartR2 |= (s_val[i] & ~len_match[i] & isl_type[i]);
        incrementR |= (q_val[i] & (len_match[i] & ~isl_type[i])
                    | isl_type[i];
    }
    q_final = | q_val;
    counterC = q_final ? 1 : ((counterC != cntC_cfg.max_count) ?
                counterC+1 : counterC );
    counterR = restartR1 ? 1
            restartR2 ? 0 :
        counterR + incrementR;
    in_range = (counterR >= cntR_cfg.min &&
            counterR <=cntR_cfg.max);
```

Figure 4B:
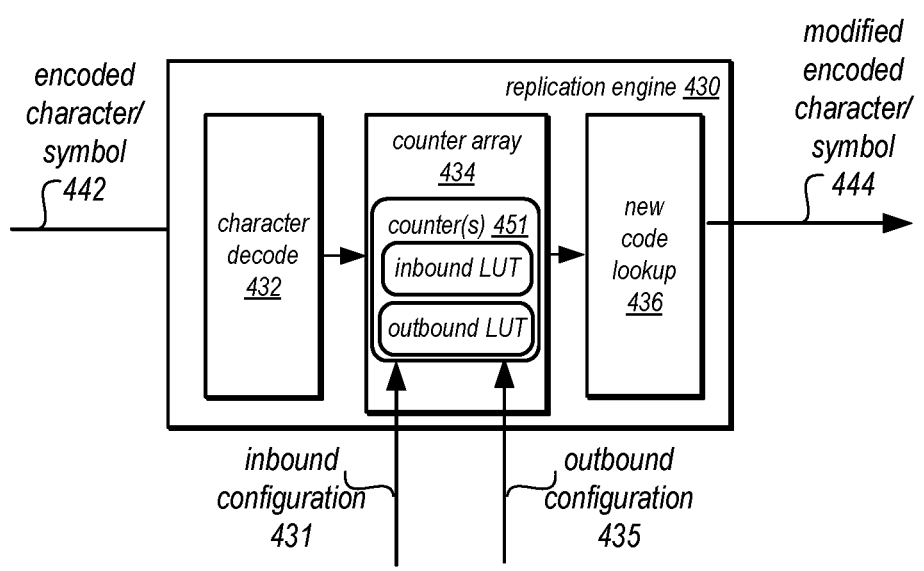

Another embodiment of a replication engine is illustrated in FIG. 4B. As noted above, replication engines may support replications on single characters or symbols (e.g., that represent multiple characters) output from match and substitution engine(s) 110. In such embodiments, replication may be tracked by 2 NFA states, one for entering replication and a second one to represent when replication is in a desired range. For example, character decode stage 432 may identify encodings that are followed by a replication operator in the regular expression. If an encoding received from matching and substitution engine 110 is identified for replication by character decode stage 432, then a corresponding counter 451 in the counter array 434 may be incremented. The counter may track the number of consecutive occurrences of the encoding in the input sequence. If the counter is in desired range, a new 9-bit encoding may be generated to trigger a transition into a new state, as indicated at 444. Each counter may uses two LUTs to check if the counter is in range for match and clearing when it exceeds configured max value. Each in-bound and out-of-bound LUT may take the whole counter and a counter increment pulse (replication character decode output) as input to generate in_range and counter clear signals to new code lookup 436.

In various embodiments, a regular expression filter may take advantage of homomorphism in order to expand the encoding and thus enhance the capability of the regular expression filter, as discussed above with regard to FIG. 1. For example, let alphabet $\Sigma1=\{0,1, \ldots 255\}$ and consider the string "0123". If $\Sigma_2=\{A, B, C, \ldots, Z, a, b, \ldots, z, ',$

[, ], . }, define h: $\Sigma_1 \rightarrow \Sigma_2^*$ as h(0)=i, h(1)=a, h(2)=m, h(3)=batman, then h*(0123)=iambatman. Note that h*(0123) has the same structure as 0123, just expressed differently. If the regular expression filter uses expanded encoding to support processing, for example, 9 bits at a time and leave the lower 256 encodings untouched, the additional encodings can be used to do programmable transformations. For example, h*( ) can be implemented using a matching engine that transforms a word of up to 'n' Bytes into a 9-bit encoding. In this way, the depth of char decode lookup table may be increased to 512 entries and index it with the 9-bit encoding to derive the character decode for next state logic (e.g., either at replication engine 120 or NFA states processing 130).

Figure 5:
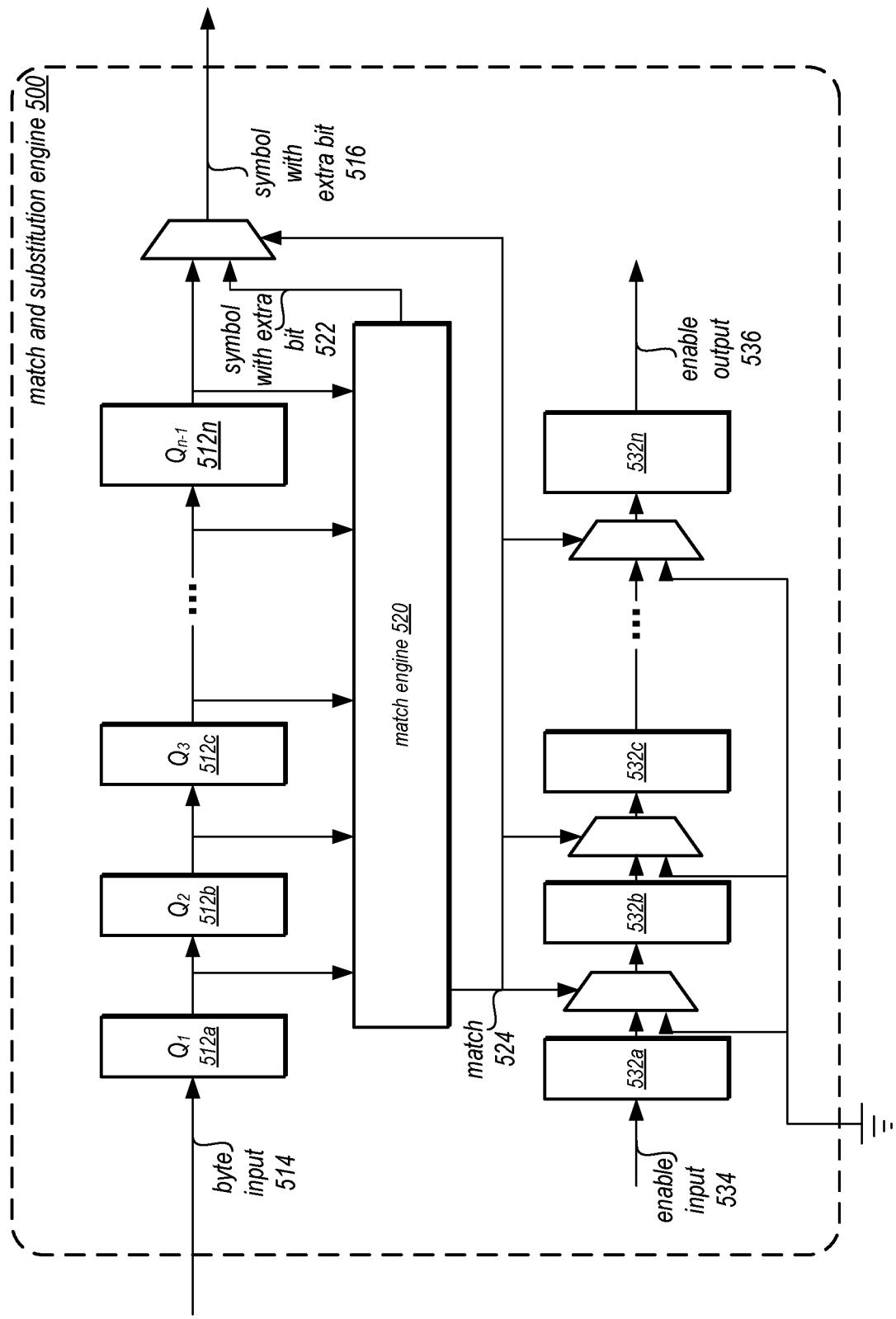
FIG. 5 is a logical block diagram illustrating an example match and substitution engine to support replications and alternations in a regular expression search, according to some embodiments.

FIG. 5 is a logical block diagram illustrating an example match and substitution engine to support replications and alternations in a regular expression search, according to some embodiments. Match and substitution engine 500 (which may be implemented in a regular expression filter as discussed above with regard to FIG. 1, may take a byte input 514 which may pass through a series of input registers 512a, 512b, 512c, through 512n which may check the stream of characters at match engine 520. Match engine 520, discussed in detail below with regard to FIG. 6, may indicate when a string of characters at two or more of input registers 512a-512n matches the string to replace with a symbol (e.g., as configured by a control that programs the regular expression filter) and output the match signal 524. The match signal 524 may be applied to the enable input signal 534 that passes through registers 532a, 532,b, 532c, through 532n in order to indicate which characters are included in the new symbol with extra bit 522 that is generated by match engine and output at 516 when a match signal is received instead of the individual character from register 512n. For example, the match signal 514 may be used to modify whether an enabled or disabled signal 536 is sent for each character (e.g., if disabled, then that character is included in a symbol that was already sent and causes the regular expression filter to treat the current output character (e.g., from 512n) as a no-op.

Match engine 520 can be implemented in various ways. For example, in some embodiments match engine 520 may be implemented as an 'm' entry CAM with fixed sized string key of 'n' Bytes and returns 9-bit value. In some embodiments, match engine 520 can be implemented as an 'm' entry CAM with variable sized string key of 2 to 'n' Bytes and returns 9-bit value. In some embodiments, match engine 520 can be implemented as an 'm' entry Range CAM with variable sized string key of 2 to 'n' Bytes and returns 9-bit value. In some embodiments, match engine 520 can be implemented as 'm' entry TCAM with variable sized string key of 2B to 8B and returns 9-bit value. In the above example, m<=256, which may allow for good compression with as little as 8-16 entries.

Substitution by a match and substitution engine 500 offers may advantages for a regular expression filter. For example, substitution may reduce a number of states to identify a matching item. Consider the example from above 'iambatman' translates to 9 states. If it were to be encoded with the substring 'batman' using the CAM structure, the implementation can be reduced to 4 states. Substitution may provide for compressed replication, in some embodiments. Repetition/replication metacharacters such as ri{m}, ri{m,n}, ri{m,} (as discussed above with regard to FIGS. 3-4B) can be implemented with the simpler approach of repeating states and edges as long as ri can be mapped to 1 or more entries in the match engine. In some embodiments, substitution can support compressed alternations. Alternations of type r1|r2| . . . |rn can be represented where ri are multicharacter strings. If each ri can be mapped to 1 entry in the match engine, then r1|r2| . . . |rn can be reduced to [h*(r1),h*(r2), . . . h*(rn)]. For example, consider the pattern [alpha|beta|gamma]. The substrings alpha, beta and gamma can be mapped to a 9 bit encoding using match engine as 0×100, 0×101, 0×102. Using these encodings, the pattern [alpha|beta|gamma] can be reduced to the form a|b|c→[abc] as [0×100,0×101,0×102]. Character decode can then map these to trigger a single state transition if either of the three substrings are seen at the input. In some embodiments, substitution may provide for multibyte characters.

Figure 6:
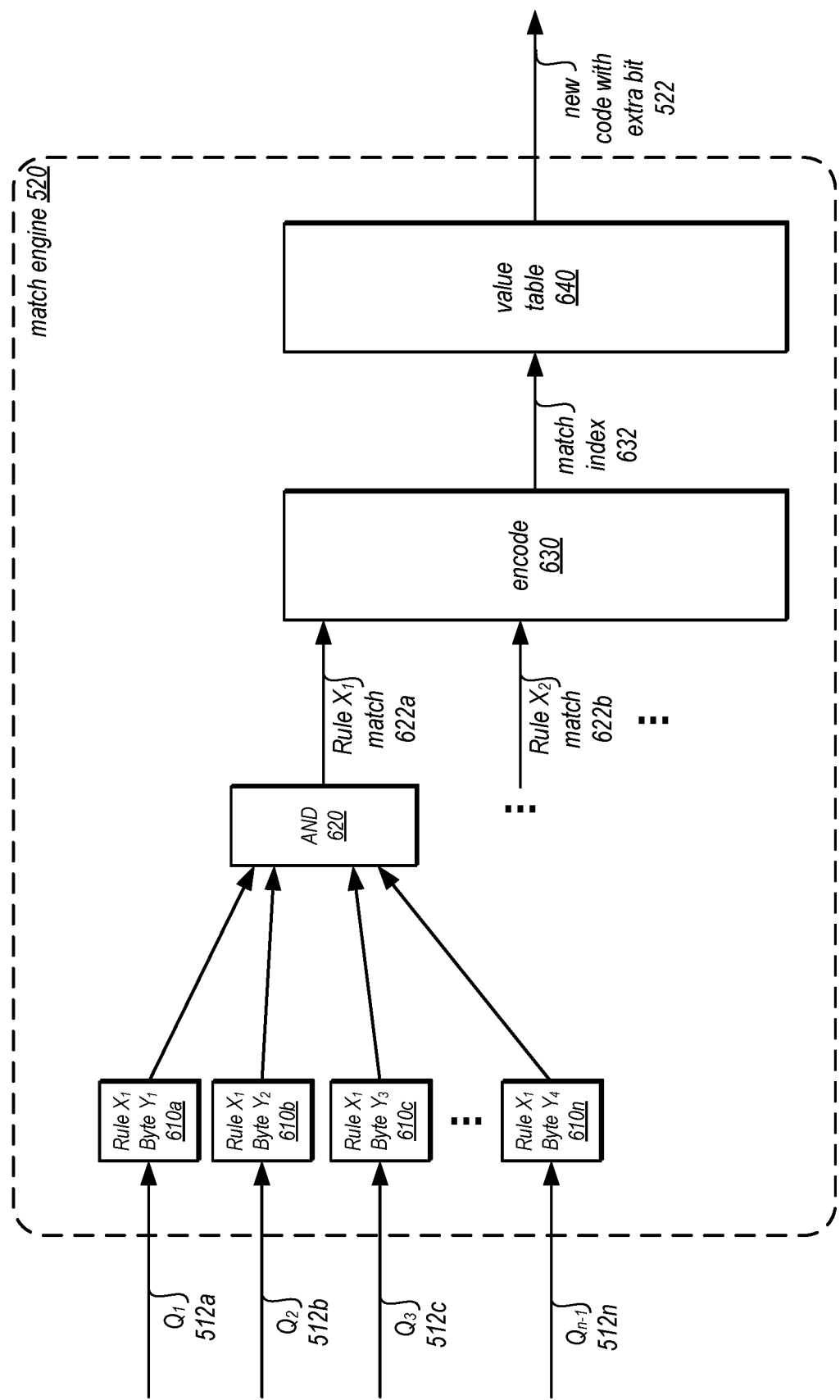
FIG. 6 is a logical block diagram of a match engine, according to some embodiments.

FIG. 6 is a logical block diagram of a match engine, according to some embodiments. Each input byte, $Q_1$–$Q_{n-1}$ (as indicated at signals 512a, 512b, 512c, and 512n) may be considered by a LUT 610a, 610b, 610c, through 610n, that applies a specific rule for that specified byte (e.g., Rule $X_1$ for Byte $Y_1$). A rule may be said to match if the outputs of all the LUTs 610 indicate a match (e.g., output "1"), which may be indicated by AND 620 to encode stage 630. Different match rules may correspond to different possible string mappings to a symbol. Encode 630 provides an index to a symbol in value table 640 with the new code with extra bit 522 that corresponds to the matching rule.

In some embodiments, the formulation of next state logic for an NFA state may be used to reduce state cost for exact string match scenarios. For example, a regular expression compiler may be able to split a regular expression into segments that are single character runs or can be classified as one (e.g., x|y|z→[xyz]). A sequence of string literals that meet exact match criteria can then be implemented in different sets of optimized states. For such states the next state logic of NFA could instead be $\delta_{ij}^* = f_{ns}(S_{i,j}S_{i,j-1}, S_{i,j-1}, CDNS_p, IS_i)$ where $CDNS_p [j]=(\Sigma_n = Cfg\_char)$. These two states could be considered exact match states. This takes away the need to implement CDNS for all states in a BRAM. We only need to use BRAM implementation for states transitioning on [] or character classes.

FIGS. 7A-7B are logical block diagrams of different versions of a regular expression filter configuration to search for a same regular expression, according to some embodiments. A regular expression derived from a search for "SIMILAR_TO get (bat|super|aqua)man" is illustrated in regex filter configuration 710. This example shows a 3-way alternate preceded and followed by shared strings. This example shows how the island topology discussed above with regard to FIG. 2, using 4 islands 712, 714, 716, and 718, can be used to implement a search for this regular expression at a regular expression filter.

In some embodiments, further optimizations to handle similar regular expressions may be performed. For example, if the incoming edges of into an island share the same transition character, then an additional decoder is not needed. In such a case, the character decoder used for next state logic may be used to achieve the same outcome. In another example optimization additional entry points into an island may be provided. For instance, as discussed above, there are 3 ways to enter an island, (i) from previous islands last state, (ii) from previous islands second last state, and (iii) using programmable jump from any island using island start decoder logic. The island start decode output fans out all next state LUTs in that island. This provides full flexibility to where the first state in the island can be placed/mapped. However, the states before the island's first placed state will likely go unused as they have no outlet to another island. Consider the example in FIG. 7A. If each island had 12 states, (bat|aqua|super) consume only 3,4 and 5 states in their respective islands. If a few self-edges are freed, island_start or previous 2 state input to the first and middle states in the island, then additional entry points in to islands can be provided and increase usable state without any additional cost. Alternatively, 2 additional LUTs per island can be added (one at the first state's nextstate logic and one at the middle state's next state logic) to increase connectivity between islands.

FIG. 7B illustrates a modified regex filter configuration 720 which uses a substitution. For example, 3 rules may be configured in match and substitution engine 500, wherein "bat" is to be substituted with 'b'+1 bit, "super" is to be substituted with 's'+1 bit, and "aqua" is to be substituted with 'a'+1 bit, which may remove the need to utilize any islands and reduce the number of states.

Figure 8:
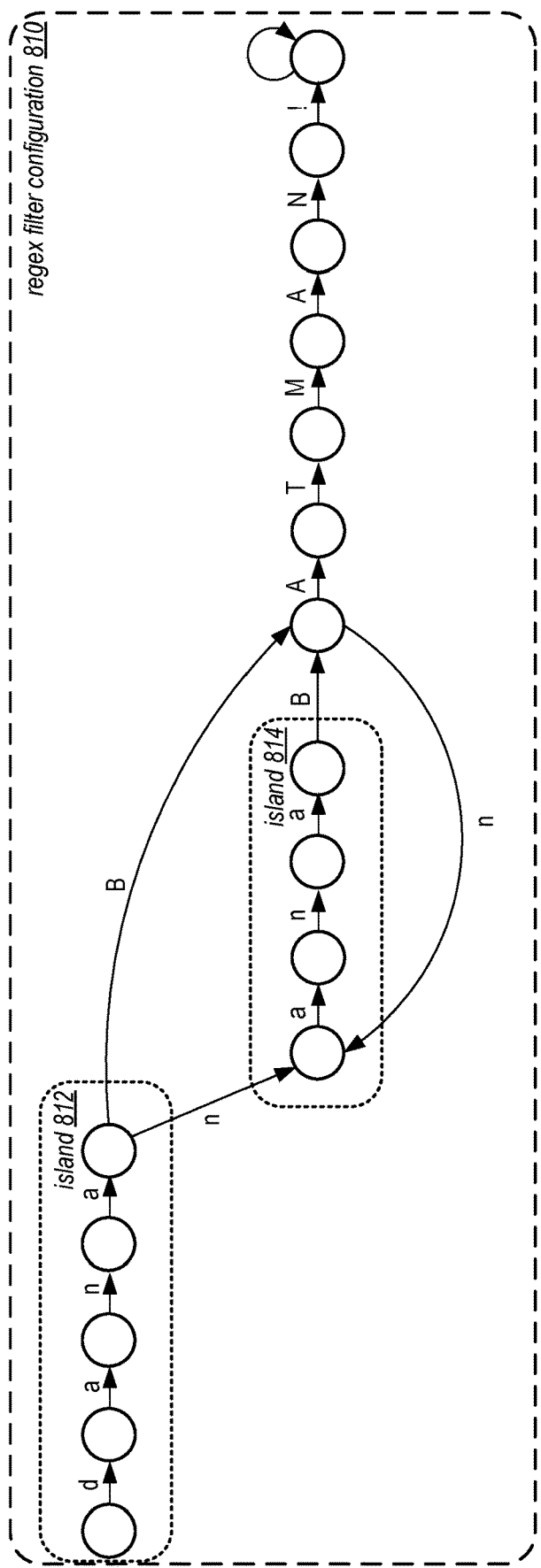
FIG. 8 is a logical block diagram of a regular expression filter configuration using islands to search for a regular expression that includes a Kleene closure, according to some embodiments.

FIG. 8 is a logical block diagram of a regular expression filter configuration using islands to search for a regular expression that includes a Kleene closure, according to some embodiments. For example, the regular expression may be "SIMILAR_TO dana(nana)*BATMAN!" which may be searched for using a set of islands, 812 and 814 to implement a Kleene closure (*) for group (nana). The string 'nana' can occur 0 or more times to trigger a match.

Figure 9:
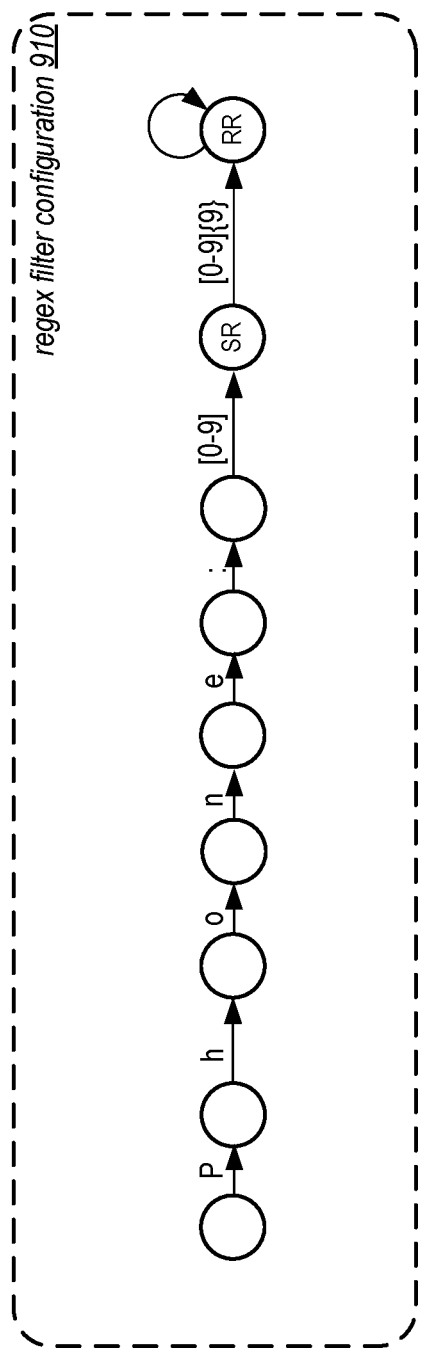
FIG. 9 is a logical block diagram of a regular expression filter configuration using a replication engine to search for a regular expression that includes a replication, according to some embodiments.

FIG. 9 is a logical block diagram of a regular expression filter configuration using a replication engine to search for a regular expression that includes a replication, according to some embodiments. For example, the regular expression search may include "Phone:[0-9]{10}". Here, SR refers to start replication state and RR refers to replication ready state. The design stays in SR state till replication count condition is not met or a non-matching character arrives.

Various different systems and devices may implement the various methods and techniques described below, either singly or working together. For example, a data processing system, like a database server, may implement dedicated circuitry like an FPGA or ASIC to implement a regular expression filter that shares character data across lookups to identify matches to a regular expression as part of a same host system as the database server and thus may implement some or all of the various methods. Different combinations of services implemented in different provider networks operated by different entities may implement some or all of the methods (e.g., a data warehouse cluster in a service of a first provider network and a hardware accelerated analytics processing service in a second provider network). Alternatively, various other combinations of different systems and devices located within or without provider networks may implement the below techniques. Therefore, the above examples and/or any other systems or devices referenced as performing the illustrated method, are not intended to be limiting as to other different components, modules, systems, or devices.

Figure 10:
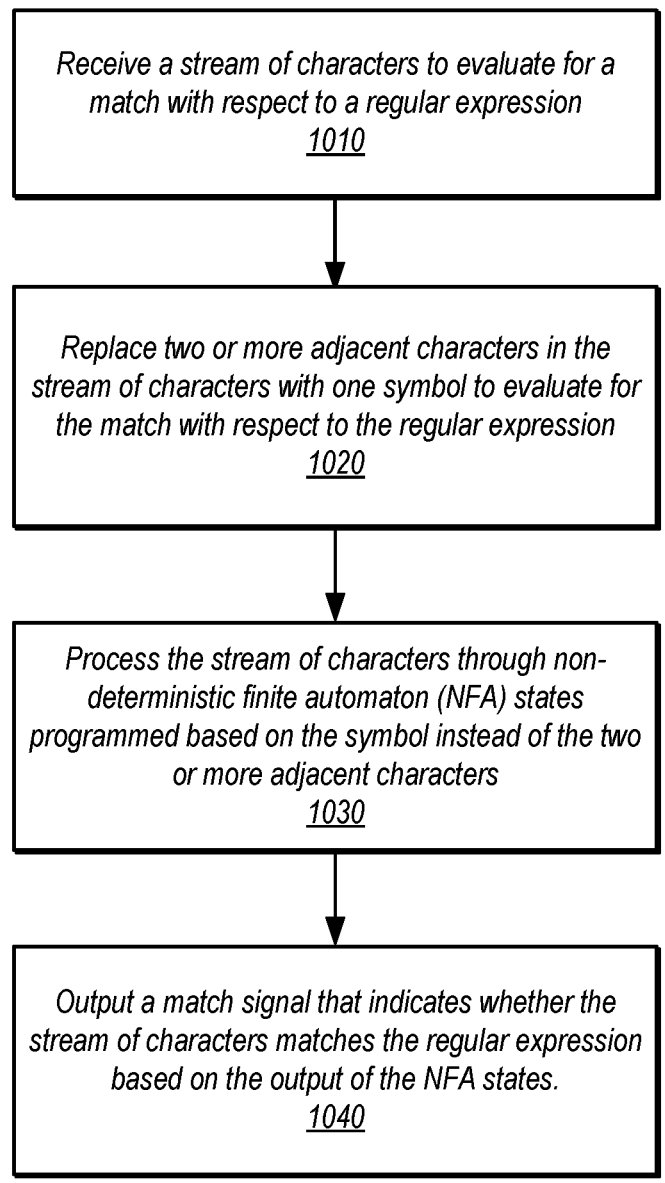
FIG. 10 is a high-level flowchart illustrating methods and techniques to perform matching and substitution for a regular expression search at a regular expression filter, according to some embodiments.

FIG. 10 is a high-level flowchart illustrating methods and techniques to perform matching and substitution for a regular expression search at a regular expression filter, according to some embodiments. As indicated at 1010, a stream of characters may be received to evaluate for a match with respect to a regular expression, in some embodiments. For example, as discussed above with regard to FIGS. 5 and 6, a match may be evaluated using one or more rules to identify a match by comparing the respective match rule for each character in a group of characters in the stream being considered in the match engine (e.g., registers 512*a*-512 providing different characters to match engine 520).

As indicated at 1020, two or more adjacent characters in the stream of characters may be replaced with one symbol to evaluate with respect to the regular expression, in some embodiments. For example, as discussed above with regard to FIGS. 5 and 6, a matching group of characters may provide an index into a lookup table, which may provide a symbol value (e.g,. an 8 bit character value plus one or more extra bits) to substitute for the group of characters. As indicated at 1030, the stream of characters may be processed through non-deterministic finite automaton (NFA) states programmed based on the symbol instead of the two or more adjacent characters, in some embodiments. In this way, a single NFA state can consider how the group of characters satisfies a regular expression (e.g., as discussed in the example above with regard to FIG. 7B where a single state transition can be satisfied by a group of characters, "aqua", "super", or "bat"). As indicated at 1040, a match signal may be output that indicates whether the stream of characters matches the regular expression based on the output of the NFA states, in some embodiments. For example, as noted earlier a final acceptor may consider the output values of one or multiple respective NFA states and can interpret whether the comination of output signals indicates a match (e.g., according to programming by a controller).

Figure 11A:
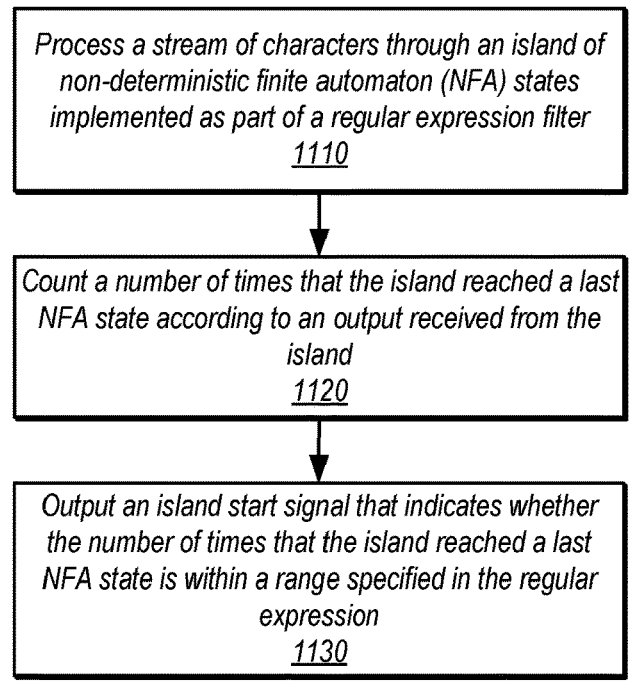
FIGS. 11A-11B are high-level flowcharts illustrating methods and techniques to implement replication for a regular expression search at a regular expression filter, according to some embodiments.
Figure 11B:
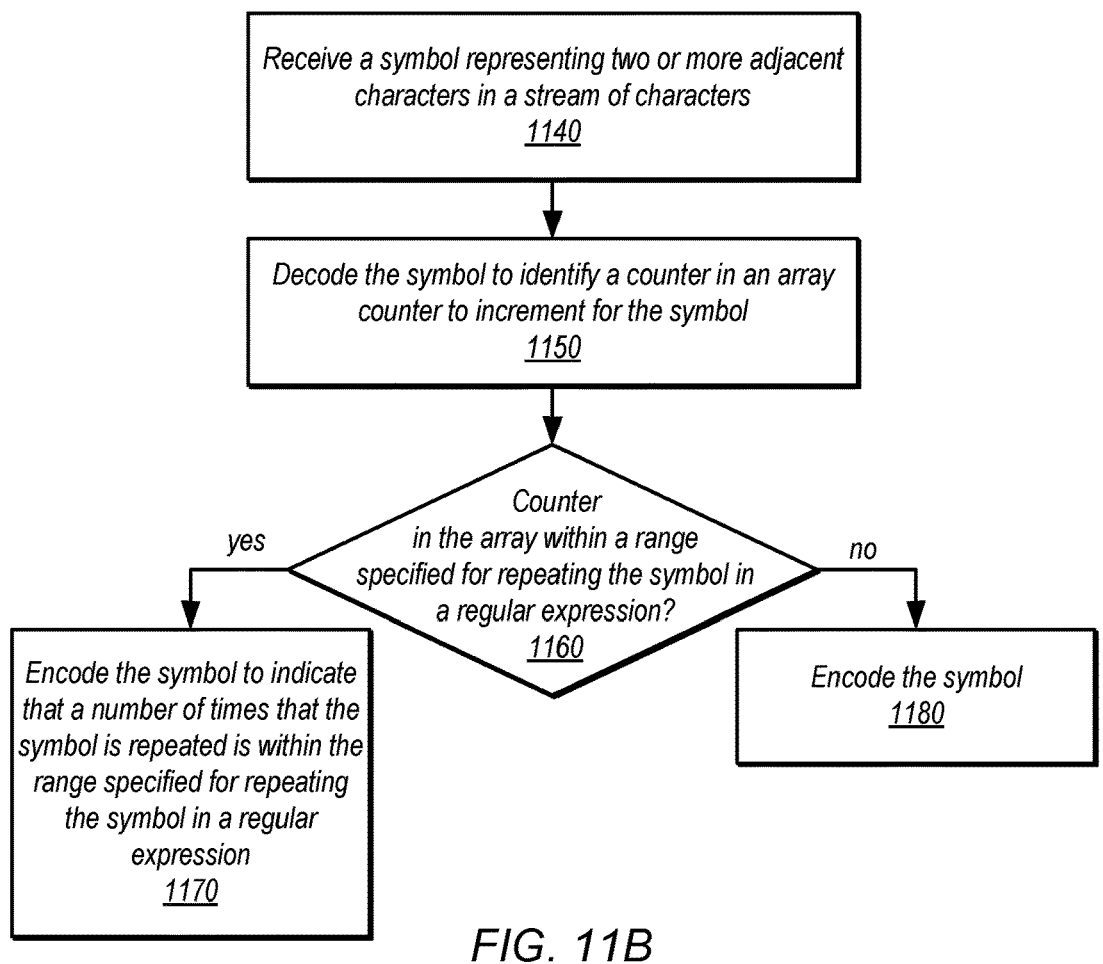

FIGS. 11A-11B are high-level flowcharts illustrating methods and techniques to implement replication for a regular expression search at a regular expression filter, according to some embodiments. FIG. 11A may discuss techniques that may be used for a regular expression filter that interacts with groups of NFA states identified as islands, as discussed in detail above with regard to FIG. 4A. For instance, as indicated at 1110, a stream of characters may be processed through an island of non-deterministic finite automaton (NFA) states implemented as part of a regular expression filter, in some embodiments. A number of times that the island reached a last NFA state according to an output received from the island (e.g., at the replication engine) may be counted, in some embodiments. Based on the count, an island start signal may be output to indicate whether (or not) the number of times that the island reached a last NFA state is within a range specified in the regular expression, as indicated at 1130, in some embodiments.

FIG. 11B illustrates techniques for a replication engine similar to those discussed above with regard to FIG. 4B. For example, a symbol representing two or more adjacent characters in a stream of characters may be received, in some embodiments, as indicated at 1140. As indicated at 1150, the symbol may be decoded to identify a counter in an array counter to increment for the symbol, in some embodiments. As indicated at 1160, a determination may be made as to whether the counter in the array for the symbol is within a range specified for repeating teh symbol in a regular expression, in some embodiments. If so, then as indicated at 1170, the symbol may be encoded to indicate that a number of times that the symbol is repeated is within the range specified for teh symbol in a regular expression, in some embodiments. In this way, the programming of NFA states can, based on the modified encoding of the symbol, determine that the repeat of the regular expression has been satisfied. As indicated by the negative exit from 1160, the symbol may be encoded again without the "in-range" indication, as indicated at 1180, in some embodiments. In this way, the programming of NFA states can determine that the repeat of the regular expression is not satisfied.

Figure 12:
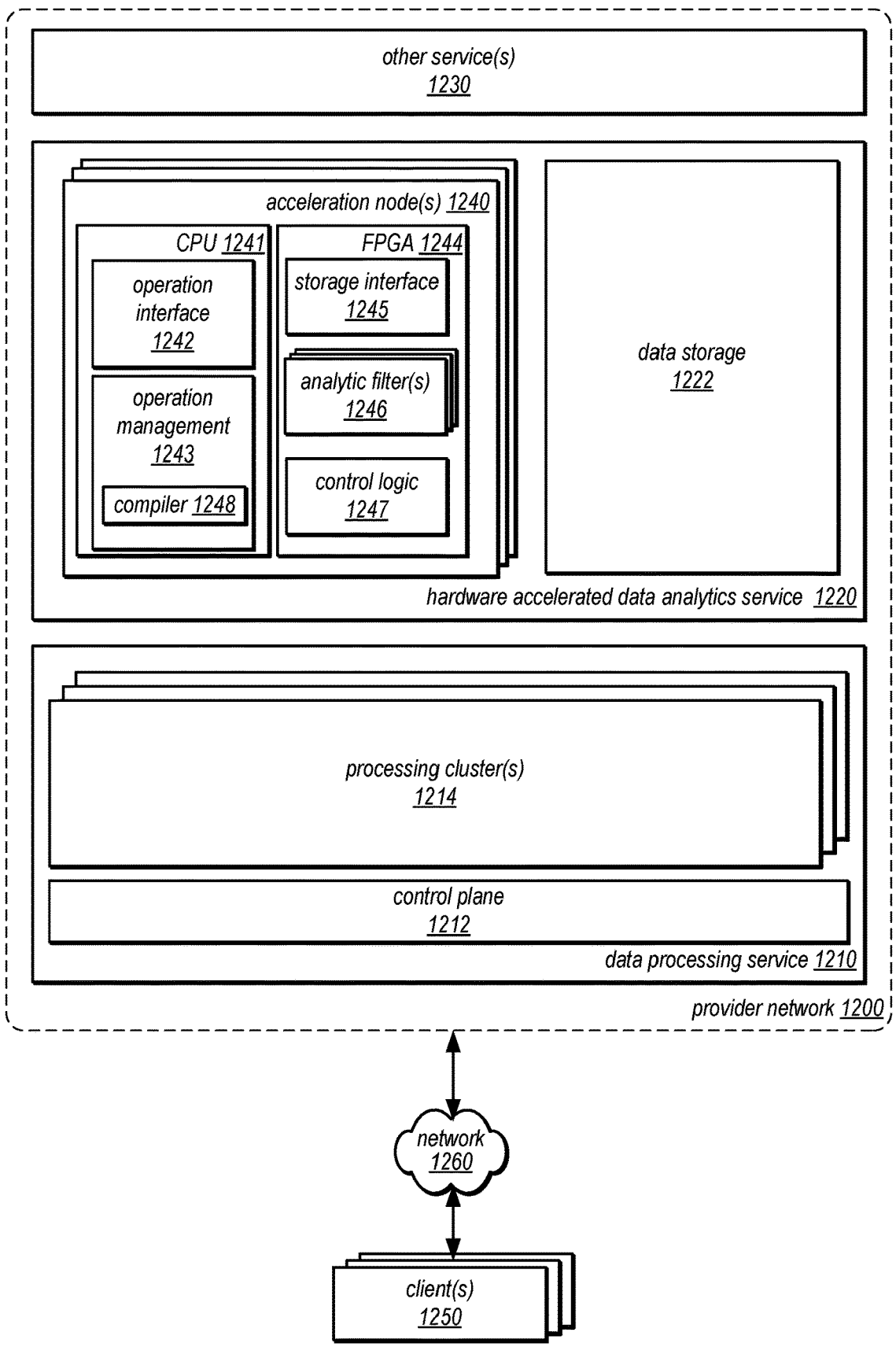
FIG. 12 is a logical block diagram of a provider network that implements a hardware acceleration service that performs analytics operations, including regular expression searches, for other provider network services, like a database service, according to some embodiments.

FIG. 12 is a logical block diagram illustrating a provider network offering data processing services that utilize a hardware accelerated data analytics service, according to some embodiments. Provider network 1200 may be a private or closed system or may be set up by an entity such as a company or a public sector organization to provide one or more services (such as various types of cloud-based storage) accessible via the Internet and/or other networks to clients 1250. Provider network 1200 may be implemented in a single location or may include numerous data centers hosting various resource pools, such as collections of physical and/or virtualized computer servers, storage devices, networking equipment and the like (e.g., computing system 2000 described below with regard to FIG. 14), needed to implement and distribute the infrastructure and storage services offered by the provider network 1200. In some embodiments, provider network 1200 may implement various computing resources or services, such as data processing service(s) 1210, (e.g., a map reduce service, a data warehouse service, and other large scale data processing services or database services), hardware accelerated data analytics service 1220, and other services 1230 that may be any other type of network based services (which may include a virtual compute service and various other types of storage, processing, analysis, communication, event handling, visualization, and security services).

In various embodiments, the components illustrated in FIG. 12 may be implemented directly within computer hardware, as instructions directly or indirectly executable by computer hardware (e.g., a microprocessor or computer system), dedicated circuitry, or using a combination of these techniques. For example, the components of FIG. 12 may be implemented by a system that includes a number of computing nodes (or simply, nodes), each of which may be similar to the computer system embodiment illustrated in FIG. 14 and described below. In various embodiments, the functionality of a given system or service component (e.g., a component of data processing service 1210, hardware accelerated data analytics service 1220, or other service 1230) may be implemented by a particular node or may be distributed across several nodes. In some embodiments, a given node may implement the functionality of more than one service system component (e.g., more than one data store component).

Data processing services 1210 may be various types of data processing services that perform general or specialized data processing functions (e.g., anomaly detection, machine learning, data mining, big data querying, or any other type of data processing operation). For example, in at least some embodiments, data processing services 1210 may include a map reduce service that creates clusters of processing nodes that implement map reduce functionality over data stored in the map reduce cluster as well as data stored in a data storage service (e.g. one of other service 1230). In another example, data processing service(s) 1210 may include various types of database services (both relational and non-relational) for storing, querying, and updating data. Such services may be enterprise-class database systems that are highly scalable and extensible.

Queries may be directed to data processing service(s) 1210 that are distributed across multiple physical resources, and the database system may be scaled up or down on an as needed basis. Data processing service(s) 1210 may work effectively with schemas of various types and/or organizations (e.g., of various types of databases), in different embodiments. In some embodiments, clients/subscribers may submit queries in a number of ways, e.g., interactively via an SQL interface to the data processing service(s) 1210. In other embodiments, external applications and programs may submit queries using Open Database Connectivity (ODBC) and/or Java Database Connectivity (JDBC) driver interfaces to the database system. For instance, data processing service(s) 1210 may implement, in some embodiments, a data warehouse service that utilizes another data processing service, such as hardware accelerated data analytics service 1220, to execute portions of queries or other access requests with respect to data (which may be stored in hardware accelerated dada analytics service 1220 or in a remote data store, such as a provider network 1200 data storage service (or a data store external to provider network 1200).

Hardware accelerated data analytics service 1220, as discussed in more detail below, may provide a service supporting many data analytics operations implemented on dedicated circuitry, such as Field Programmable Gate Arrays (FPGAs), system-on-a-chip (SoC) or Application Specific Integrated Circuits (ASICs).

Hardware accelerated data analytics service 1220 may perform requested operations, such as scan operations that filter out data results according to string or numeric value comparisons, aggregation operations that aggregate data values and provide partial or complete aggregation results, or other operations that organize or reduce the determined data results retrieved from storage using circuitry dedicated to and optimized for the performance such operations. For example, hardware accelerated data analytics service 1220 may execute different operations that are part of a larger query plan generated at a data processing service 1210 (such as discussed below with regard to FIG. 4 and provide results to the data processing service 1210 by relying upon requests from data processing service(s) 1210 to determine the different operations to perform. In this way, hardware accelerated data analytics service 1220 may be implemented as a dynamically scalable and stateless analytics processing service that is fault tolerant without the need to support complex query planning and execution for multiple different analytics operations that can be performed faster and using less resources with hardware implementations of the analytics operations. Instead, hardware accelerated data analytics service 1220 may offer a set of data processing capabilities to filter or otherwise retrieve data.

In some embodiments, other service(s) 1230 may implement different types of data stores for storing, accessing, and managing data on behalf of clients 1250 as a network-based service that enables clients 1250 to operate a data storage system in a cloud or network computing environment. Data storage service(s) may also include various kinds of object or file data stores for putting, updating, and getting data objects or files. For example, one data storage service may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, such data storage service(s) may be treated as a data lake. For example, an organization may generate many different kinds of data, stored in one or multiple collections of data objects in a data storage service. The data objects in the collection may include related or homogenous data objects, such as database partitions of sales data, as well as unrelated or heterogeneous data objects, such as audio files and web site log files. Data storage service(s) may be accessed via programmatic interfaces (e.g., APIs) or graphical user interfaces. For example, hardware accelerated data analytics service 1220 may access data objects stored in data storage services via the programmatic interfaces (as discussed below with regard to FIG. 14).

Generally speaking, clients 1250 may encompass any type of client that can submit network-based requests to provider network 1200 via network 1260, including requests for storage services (e.g., a request to query a data processing service 1210, or a request to create, read, write, obtain, or modify data in data storage service(s), etc.). For example, a given client 1250 may include a suitable version of a web browser, or may include a plug-in module or other type of code module that can execute as an extension to or within an execution environment provided by a web browser. Alternatively, a client 1250 may encompass an application such as a database application (or user interface thereof), a media application, an office application or any other application that may make use of data processing service(s) 1210, hardware accelerated data analytics service 1220, or storage resources in data storage service(s) 1230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 1250 may be an application that can interact directly with provider network 1200. In some embodiments, client 1250 may generate network-based services requests according to a Representational State Transfer (REST)-style network-based services architecture, a document- or message-based network-based services architecture, or another suitable network-based services architecture.

In some embodiments, a client 1250 may provide access to provider network 1200 to other applications in a manner that is transparent to those applications. For example, client 1250 may integrate with an operating system or file system to provide storage on one of data storage service(s) 1230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 1230 may be coordinated by client 1250 and the operating system or file system on behalf of applications executing within the operating system environment. Similarly, a client 1250 may be an analytics application that relies upon data processing service(s) 1210 to execute various queries for data already ingested or stored in the data processing service (e.g., such as data maintained in a data warehouse service) or data stored in a data lake hosted in data storage service(s) by performing federated data processing between the data processing service 1210 and hardware accelerated data analytics service 1220. In some embodiments, clients of data processing services 1210, hardware accelerated data analytics service 1220, and/or other service(s) 1230 may be implemented within provider network 1200 (e.g., an application hosted on a virtual computing resource that utilizes a data processing service 1210 to perform database queries) to implement various application features or functions and thus various features of client(s) 1250 discussed above may be applicable to such internal clients as well.

Clients 1250 may convey network-based services requests (e.g., access requests to read or write data may be directed to data in data storage service(s) 1230, operations, tasks, or jobs, being performed as part of data processing service(s) 1220, or to interact with data catalog service 1210) to and receive responses from provider network 1200 via network 1260. In various embodiments, network 1260 may encompass any suitable combination of networking hardware and protocols necessary to establish network-based-based communications between clients 1250 and provider network 1200. For example, network 1260 may generally encompass the various telecommunications networks and service providers that collectively implement the Internet. Network 1260 may also include private networks such as local area networks (LANs) or wide area networks (WANs) as well as public or private wireless networks. For example, both a given client 1250 and provider network 1200 may be respectively provisioned within enterprises having their own internal networks. In such an embodiment, network 1260 may include the hardware (e.g., modems, routers, switches, load balancers, proxy servers, etc.) and software (e.g., protocol stacks, accounting software, firewall/security software, etc.) necessary to establish a networking link between given client 1250 and the Internet as well as between the Internet and provider network 1200. It is noted that in some embodiments, clients 1250 may communicate with provider network 1200 using a private network rather than the public Internet.

In at least some embodiments, one of data processing service(s) 1220 may be a data warehouse service. A data warehouse service may use a hardware-accelerated data analytics service to perform data analytics operations, according to some embodiments. A data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

In some embodiments, a data processing service 1210 may be implemented by a large collection of computing devices, such as customized or off-the-shelf computing systems, servers, or any other combination of computing systems or devices, such as the various types of systems 2000 described below with regard to FIG. 14. Different subsets of these computing devices may be controlled by control plane 1212. Control plane 1212, for example, may provide a cluster control interface to clients or users who wish to interact with the processing clusters 1214 managed by control plane 310. For example, control plane 1212 may generate one or more graphical user interfaces (GUIs) for storage clients, which may then be utilized to select various control functions offered by the control interface for the processing clusters 1214 hosted in the data processing service 1210.

As discussed above, various clients (or customers, organizations, entities, or users) may wish to store and manage data using a data management service. Processing clusters may respond to various requests, including write/update/store requests (e.g., to write data into storage) or queries for data (e.g., such as a Server Query Language request (SQL) for particular data), as discussed below with regard to FIG. 5, along with many other data management or storage services. Multiple users or clients may access a processing cluster to obtain data warehouse services. In at least some embodiments, a data processing service 1210 may provide network endpoints to the clusters which allow the clients to send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Processing clusters, such as processing clusters 1214 hosted by the data processing service 1210 may provide an enterprise-class database query and management system that allows users to send data processing requests to be executed by the clusters 1214, such as by sending a query to a cluster control interface implemented by the network-based service. Processing clusters 1214 may perform data processing operations with respect to data stored locally in a processing cluster, as well as remotely stored data. For example, another service, like hardware accelerated data analytics service 1220 may store (or have access to stored) data, which may be accessed or otherwise operated upon when queries are sent to a processing cluster 1214. For example, queries sent to a processing cluster 1214 may be directed to local data stored in the processing cluster and/or remotely stored data. Therefore, processing clusters 1214 may plan and execute the performance of queries with respect to local data in the processing cluster, as well as a remote data processing client to direct execution of different operations determined as part of the query plan generated at the processing cluster that are assigned to hardware accelerated data analytics service 1220 with respect to processing remote data. In at least some embodiments, data processing clusters 1214 may support some analytics operations by relying upon hardware accelerated data analytics service 1220 to perform operations, such as a query with a regular expression as a predicate, with respect to data.

In some embodiments, hardware accelerated data analytics service 1220 may receive requests to perform processing operations with respect to data stored in a data storage service (e.g., in other service(s) 1230) or data storage 1222 implemented as part of hardware accelerated analytics service 1220). Processing requests may be received from a client, such as remote data analytics client(s) (which may another data processing service 1210, like a data warehouse service or another data processing client, such as a database engine/cluster or map reduce cluster implemented outside of provider network 1200 and communicating with hardware accelerated data analytics service 1220 in order to process queries with respect to data stored within provider network 1200 or to process data stored outside of provider network 1200 (when the data is made accessible to hardware accelerated data analytics service 1220).

Hardware accelerated data analytics service 1220 may implement a control plane and multiple acceleration node(s) 1240 to execute processing requests received from remote data processing client(s). Control plane of hardware accelerated data analytics service may arbitrate, balance, select, or dispatch requests to different acceleration node(s) 1240 in various embodiments. For example, the control plane may implement interface which may be a programmatic interface, such as an application programming interface (API), that allows for requests to be formatted according to the interface to programmatically invoke operations. In some embodiments, the API may be defined to allow operation requests defined as objects of code generated at and sent from remote data processing client(s) (based on a query plan generated at remote data processing client(s)) to be compiled or executed in order to perform the assigned operations at hardware accelerated data analytics service 1220.

In some embodiments, hardware accelerated data analytics service 1220 may implement load balancing to distribute remote processing requests across different acceleration node(s) 1240. For example, a remote processing request received via interface may be directed to a network endpoint for a load-balancing component of load balancing (e.g., a load balancing server or node) which may then dispatch the request to one of acceleration node(s) 1240 according to a load balancing scheme. A round-robin load balancing, for instance, may be used to ensure that remote data processing requests are fairly distributed amongst acceleration node(s) 1240. However, various other load-balancing schemes may be implemented. As hardware accelerated data analytics service 1220 may receive many remote data processing requests from multiple remote data processing client(s), load balancing may ensure that incoming requests are not directed to busy or overloaded acceleration node(s) 1240. In some embodiments, mapping or other routing information may be maintained so that requests for data are mapped to acceleration node(s) 1240 that store the data in attached storage for performing analytics operations (as opposed to obtaining the data from other storage locations as may be performed in other embodiments).

Hardware accelerated data analytics service 1220 may also implement resource scaling. Resource scaling may detect when the current request rate or workload upon a current number of acceleration node(s) 1240 exceeds or falls below over-utilization or under-utilization thresholds for processing nodes. In response to detecting that the request rate or workload exceeds an over-utilized threshold, for example, then resources scaling may provision, spin up, activate, repurpose, reallocate, or otherwise obtain additional acceleration node(s) 1240 to perform received remote data processing requests. Similarly, the number of acceleration node(s) 1240 could be reduced by resource scaling in the event that the request rate or workload of analytic processing node(s) falls below the under-utilization threshold.

Hardware accelerated data analytics service 1220 may also implement failure management to monitor acceleration node(s) 1240 and other components of hardware accelerated data analytics service 1220 for failure or other health or performance states that may need to be repaired or replaced. For example, failure management may detect when an acceleration node 1240 fails or becomes unavailable (e.g., due to a network partition) by polling acceleration node(s) 1240 to obtain health or performance status information. Failure management may initiate shutdown or halting of processing at failing acceleration node(s) 1240 and provision replacement acceleration node(s) 1240.

Figure 14:
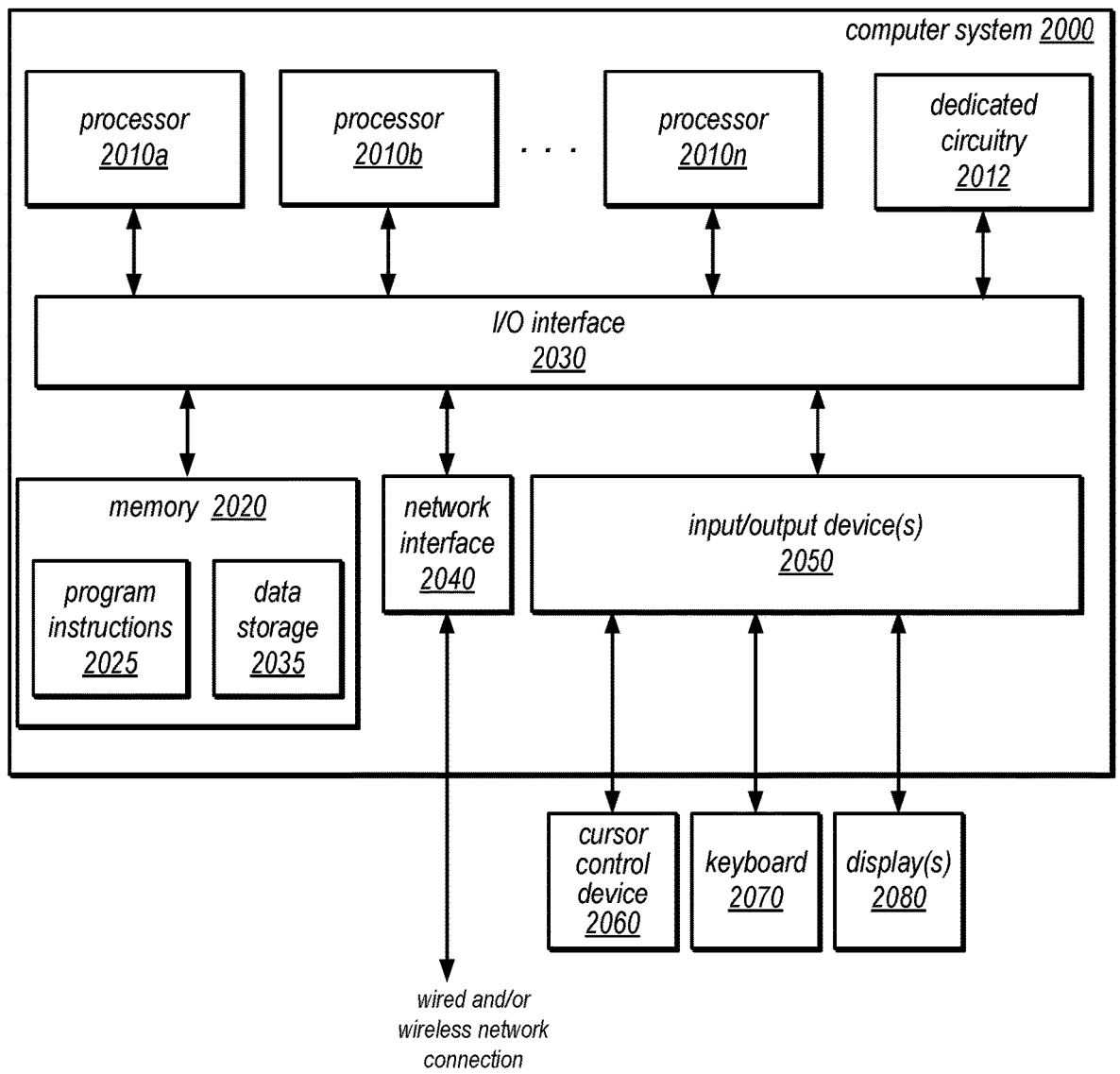
FIG. 14 illustrates an example system that implements the various methods, techniques, and systems described herein, according to some embodiments.

Acceleration node(s) 1240 may be implemented as separate computing nodes, servers, or devices, such as computing systems 2000 in FIG. 14, to perform data processing operations on behalf of remote data processing client(s). Acceleration node(s) 1240 may implement stateless, in-memory processing to execute operations, in some embodiments. In this way, acceleration node(s) 1240 may have fast data processing rates. Acceleration node(s) 1240 may implement client authentication/identification to determine whether a remote data processing client has the right to access data. For example, client authentication/identification may evaluate access credentials, such as a username and password, token, or other identity indicator by attempting to connect with storage device. If the credentials are not valid, then the acceleration node 1240 may send an error indication to remote data analytics client.

Acceleration node(s) 1240 may implement operation processing which may perform multiple different processing operations, as discussed in detail below with regard to FIG. 13, to perform various analytics operations upon data before returning operation results and/or retrieve data without modification or analysis. In some embodiments, analytic processing node(s) may be directly attached to one or more storage devices 530. For example, storage devices may include, but not be limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof.

Acceleration node(s) 1240 may include dedicated circuitry on a host system, such as dedicated circuitry 2012 of system 2000 in FIG. 14, like an application specific integrated circuit (ASIC), field programmable gate array (FPGA), or system-on-a-chip (SoC), in order to implement hardware optimized and thus accelerated for data analytics operations. FIG. 13 is a logical block diagram of operation processing at an analytics processing node that utilizes a Field Programmable Gate Array (FPGA) to implement filters for performing data analytics operations, according to some embodiments, including a regular expression filter according to the various techniques discussed above with regard to FIGS. 1-11. Although similar features and implementations could be achieved using other forms of integrated circuitry.

As illustrated in FIG. 12, acceleration node(s) 1240 may utilize both a general purpose processor, like CPU 1241, and an FPGA 1244, in order to perform analytics operations. CPU 1241 may execute program instructions to implement an operation interface 1242 for an analytics processing node, in some embodiments. Operation interface 1242 may be implemented, for example, as an API that a data analytics client can invoke to perform data operations for a query, in some embodiments. As multiple different types of operations may be supported, in some embodiments, the operation interface may identify which type of operation is to be performed and what data is to be accessed according to parameters provided via operation interface. For example, operation request may specify an operation type or identifier, parameters for performing the operation (e.g., a regular expression for applying a regular expression filter), and identify which data is to be accessed and operated upon (e.g., by identifying a file name, object or table name, network address, block address or range of addresses, etc.).

In various embodiments, operation management 1243 may manage performance of operations at FPGA 1244. For example, operation management 1243 may determine additional parameters or values to perform a requested operation. For example, if the operation request is to apply a regular expression filter to a set of items (e.g., tuples of database), then operation management 1243 may use compiler 1248 to compile the regular expression included in the operation request into a nondeterministic finite automata (NFA) (e.g., according to a compiler for the language that specified the regular expression such as POSIX, glob, or PERL, among others) and then convert the NFA into respective bit formats for performing lookup operations for each respective state of the NFA so that the state machine components of the NFA can be programmed and evaluated at an analytics filter 1246. For example, operation management may provide the compiled regular expression to control logic 1247 so that control logic 1247 may loop or iterate through the NFA states on the filter to store values for lookup tables that indicate whether an input character at that character position sets the state value to TRUE. The parameter values may be written, in some embodiments, to a memory (not illustrated) which FPGA 1244 can access in order to retrieve the parameters when signaled to perform the operation.

Operation management 1243 can send a signal or other request to control logic 1247 of FPGA 1244 to perform an operation. As illustrated in FIG. 12, multiple analytic filter(s) 1246 may be implemented, which may be programmed or instructed to perform different operations. Control logic 1247 may signal to an available one of analytic filters 1246 to perform the requested operation. Control logic 1247 may provide the parameter values to an analytic filter 1246. For example, in some embodiments, a ticket paradigm may be implemented for signaling operations to FPGA 1244. Operations management 614 may write a ticket in a memory accessible to FPGA 1244 (e.g., host memory or FPGA memory) and may signal the presence of the ticket by writing an address location of the ticket to a ticket control register. The ticket may include the operation type, which includes the identity of the operation to perform (e.g., bypass filter, delete data, modify data, evaluate predicates and produce a bitmask or other indication as to which data matches a predicated, such as a predicate indicated by a regular expression), an identifier specific to the operation (as multiple operations of the same type can be performed at different analytics filters), information to program the filter operations (e.g., lookup table values, accept vector values for a positive match, and so on), size of data items (e.g., tuple size), location of data, among other information. In some embodiments, control logic 1247 may implement a queue or other data structure for adding new operations and removing completed operations to be performed at one of analytic filter(s) 1246 (e.g., by queuing ticket pointers).

FPGA 1244 may implement one or multiple analytic filter(s) 1246, in various embodiments. Analytic filter(s) 1246 may be programmable to perform different operations for different requests. For example, two different analytic filters 1246 can filter tuples from different tables according to different regular expressions programmed to the analytic filters at or in near parallel. Other operations, such as numerical comparisons, string comparison, aggregation operations (e.g., summation, count, average, etc.) may be performed by analytic filters in addition to regular expression filtering, as discussed below. Analytic filter(s) 1246 may utilize storage interface 1245 to read from and write data to storage devices. In some embodiments, storage interface 1245 may send read and write requests to a peripheral device connected to a host system for the analytics processing node and/or the storage devices, which may retrieve the data and perform other processing of the data, such as encryption/decryption and/or compression/decompression.

Figure 13:
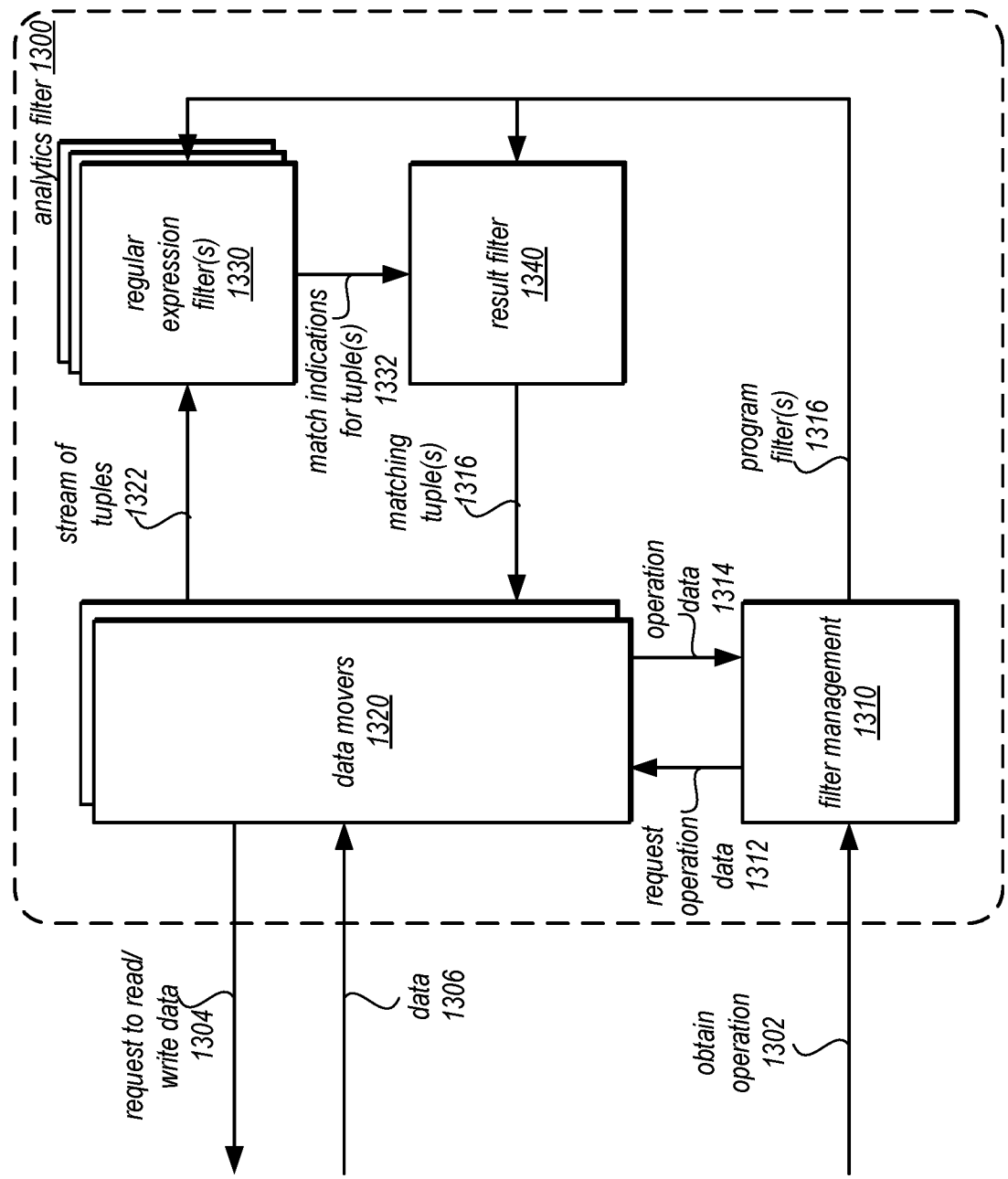
FIG. 13 is a logical block diagram of an analytics filter that includes a regular expression filter that can implement expanded character encoding to enhance regular expression filter capabilities, according to some embodiments.

FIG. 13 is a logical block diagram of an analytics filter that includes a regular expression filter that can implement expanded character encoding to enhance regular expression filter capabilities, according to some embodiments. Analytics filters, like analytics filters 1246 in FIG. 12, may be able to perform different operations. One such operation is a regular expression filter, as discussed in more detail above with regard to FIGS. 1-11. In addition to the operation filter itself, other supporting components of an analytics filter may be implemented in order to allow for each filter to perform an operation independent of other operations.

For example, as illustrated in FIG. 13, analytics filter 1300 may include a filter management component 1310. Filter management component 1310 may obtain an operation 1302 to perform. For example, filter management 1310 may implement state or status registers which indicate when an operation at filter 1300 is in progress when the operation completes (or fails), filter management 1310 may detect the completion and request or get another operation to perform (e.g., by removing an operation from an operation queue in control logic in FIG. 12). Filter management 1310 may request operation data 1312 from a data mover 1320, which may be able to access operation data (e.g., in CPU 1241 or FPGA 1244 memory) by requesting 1304 and receiving 1306 the operation data in order to initiate programming 1316 of the one or more regular expression filter(s) 1330 and result filter 1340 based on the received operation data 1314.

For example, filter management 1310 may request the ticket data of the ticket obtained from the queue (e.g., according to an address or location of the ticket data obtained from the queue). Data mover(s) 1320 may read the ticket data from the identified location (e.g., in host memory or FPGA memory), and return the ticket data to filter management 1310. Filter management 1310 may then parse ticket data in order to perform operations to update configuration settings for regular expression filter(s) 1330 and result filter 1340 by modifying register values, lookup table values, and so on, as specified in the ticket data. For example, the various lookup table values for the NFA states to be detected by regular expression filter(s) 1330, as discussed below.

Filter management 1310 may also update configuration parameters for data movers 1320 to begin retrieving data from one or more storage devices for filtering at regular expression filter(s) 1330, in some embodiments. For example, a starting location or address in a storage device and an amount or length of data to read may be provided so that data movers 1320 may initiate requests 1304 to receive data 1306 from the location and provide the data as a stream of tuples 1322 to regular expression filter(s) 1330. Configuration parameters may include size of tuples (e.g., in bytes), in some embodiments.

Stream of tuples 1322 may be provided to regular expression filter(s) 1330, which may evaluate the stream of tuples and provide match indications 1332 for tuples. Result filter 1340 may be implemented, in some embodiments to format or output matching tuple(s) 1316 as a stream so that data movers 1320 can write 1304 the matching tuple(s) 1316 to a memory or other location to be provided as part of an operation result by operation interface 1242 as discussed above in FIG. 12. For example, result filter 1340 may perform data packing to shift together tuples that match the regular expression, removing gaps between filters, and/or remove non-matching tuples from the tuple stream so that only those matching tuples are transmitted as part of matching tuple(s) 1316. In other embodiments, result filter 1340 may provide a bitmask or other indication of which tuples match the regular expression (and which do not) along with the tuple stream (not illustrated). Result filter 1340 may, in some embodiments, detect when a last tuple in the stream has been evaluated by regular expression filter 1330 and signal a completion of the operation to filter management 1310 and/or data movers 1320 so that operation management 1243 can fetch operation result(s) and/or signal completion of the operation to a client. For example, result filter can generate and provide a ticket receipt to be written to a receipt location for the ticket in a host memory to indicate completion to operation management 1243 which may poll or otherwise detect the completion at the receipt location.

Please note that an analytics filter like analytics filter 1300 or 1246 in FIG. 12 can perform multiple different operations, in some embodiments. Therefore additional components to perform other operations in addition to regular expression filtering (e.g., number comparisons and/or operations, or other string-based operations) may be implemented which are not illustrated and which may provide results via result filter 1340.

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of expanded character encoding to enhance regular expression filter capabilities as described herein may be executed on one or more computer systems, which may interact with various other devices. One such computer system is illustrated by FIG. 14. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions (e.g., a compiler to compile a regular expression), such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 14, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. One or more integrated circuits, configured to implement a regular expression filter, the regular expression filter comprising:
   a match and substitution engine, configured to:
      compare two or more adjacent characters in a stream of characters being processed through the match and substitution engine with a rule to recognize the two or more adjacent characters whether the two or more adjacent characters are a match for a regular expression, wherein the rule instructs the match and substitution engine to replace the two or more adjacent characters with a symbol to substitute for the two or more adjacent characters;
      based on the comparison, identify the two or more adjacent characters in the stream of characters according to the rule as the match for evaluating the regular expression; and
      for a first character of the two or more adjacent characters:
         output the symbol in place of the first character of the two or more adjacent characters in the stream of characters; and
         output an enabled signal for the symbol;

for a second character of the two or more adjacent characters that occurs after the first character of the two or more adjacent characters in the stream of characters:
output the second character in the stream of characters; and
output a disabled signal for the second character;
one or more non-deterministic finite automaton (NFA) states, configured to process:
the symbol as a replacement of the first character in the two or more adjacent characters in the stream of characters; and
the second character of the two or more adjacent characters in the stream of characters as a no-op according to the disabled signal output from the match and substitution engine; and
a final acceptor, configured to provide a match signal that indicates whether the stream of characters matches the regular expression based on respective outputs of the one or more NFA states.

2. The one or more integrated circuits of claim 1, wherein the regular expression includes a group Kleene closure and wherein the one or more NFA states are grouped in one or more islands.

3. The one or more integrated circuits of claim 1, wherein the regular expression filter further comprises:
a replication engine, configured to:
decode the symbol to identify a counter for the symbol in an array of counters;
increment the counter identified for the symbol to count a number of times that the symbol in the stream of characters is repeated; and
encode the symbol to indicate that the number of times that the symbol is repeated is within a range specified in the regular expression; and
wherein the non-deterministic finite automaton (NFA) states process the stream of characters based on the indication that the number of times the symbol is repeated is within the range specified in the regular expression.

4. The one or more integrated circuits of claim 1, wherein the one or more integrated circuits are implemented on a Field Programmable Gate Array (FPGA), Application Specific Integrated Circuit (ASIC), or System-on-a-Chip (SoC).

5. A method, comprising:
performing, by dedicated circuitry implementing a regular expression filter:
receiving a stream of characters to evaluate for a match with respect to a regular expression;
determining, by a match and substitution engine implemented as part of the regular expression filter, that two or more adjacent characters in the stream of characters correspond to a symbol;
for a first character of the two or more adjacent characters:
replacing the first character of the two or more adjacent characters in the stream of characters with one symbol as an output of the match and substitution engine to evaluate for the match with respect to the regular expression; and
sending an enabled signal from the match and substation engine for the symbol;
for a second character of the two or more adjacent characters that occurs after the first character of the two or more adjacent characters in the stream of characters:
providing the second character as a next output from the match and substation engine; and
sending a disabled signal for the second character from the match and substitution engine; and
processing the stream of characters through one or more non-deterministic finite automaton (NFA) states implemented as part of the regular expression filter and programmed based on the one symbol for the first character of the two or more adjacent characters as indicated by the enabled signal to output a match signal that indicates whether the stream of characters matches the regular expression, wherein the one or more NFA states are programmed to treat the second character of the two or more adjacent characters in the stream of characters as a no-op according to the disabled signal sent from the match and substitution engine.

6. The method of claim 5, wherein determining that two or more adjacent characters in the stream of characters correspond to a symbol comprises comparing the stream of characters with one or more rules for different respective substitutions to recognize the two or more adjacent characters in the stream of characters to replace with the symbol.

7. The method of claim 5, wherein the symbol comprises one or more bits in addition to a plurality of bits comprising a character value.

8. The method of claim 5, wherein the one or more NFA states are grouped as an island and wherein the method further comprises:
after processing the stream of characters through the one or more NFA states grouped as the island:
updating a counter that tracks a number of times the island reached a last NFA state according to received output from the island;
wherein processing the stream of characters through another one or more NFA states is further based on a determination that the number of times that the number of times that the island is repeated within a range specified in the regular expression as indicated in an island start signal.

9. The method of claim 5, further comprising:
before processing the stream of characters through the one or more NFA states:
decoding the symbol to identify a counter for the symbol in an array of counters;
incrementing the counter identified for the symbol to count a number of times that the symbol in the stream of characters is repeated; and
wherein processing the stream of characters through the one or more NFA states programmed is further based on a determination that the number of times that the symbol in the stream of characters is repeated is within a range specified in the regular expression.

10. The method of claim 5, wherein the regular expression includes an unbounded repeat on a group and wherein the one or more NFA states are grouped in one or more islands.

11. The method of claim 10, wherein an output signal from one of the one or more islands is an island start signal to another one of the one or more islands of at least one of the one or more NFA states.

12. The method of claim 5, further comprising:
replacing a different two or more adjacent characters in the stream of characters with a different symbol to evaluate for the match with respect to the regular expression; and wherein processing the stream of characters through the one or more NFA states is further based on the different symbol instead of the different two or more adjacent characters.

13. The method of claim 5, wherein the regular expression is included in a query received at a data processing service of a provider network, wherein the data processing service sends a request to a hardware analytics services of the provider network that includes the regular expression filter to perform a search upon data using the regular expression.

14. A system, comprising:
at least one processor;
a memory, storing program instructions that cause the at least one processor to implement a controller for a regular expression filter;
one or more integrated circuits, configured to implement the regular expression filter, the regular expression filter comprising a match and substitution engine, a plurality of non-deterministic finite automaton (NFA) states, and a final acceptor;
the controller, configured to:
program the NFA states to evaluate a stream of characters with respect to a regular expression based on a symbol that replaces a first character of two or more adjacent characters in the stream of characters; and
cause the regular expression filter to:
recognize, by the match and substitution engine, the two or more adjacent characters in the stream of characters to replace the first character of the two or more adjacent characters with the symbol;
for a first character of the two or more adjacent characters:
output, by the match and substation engine, the symbol in place of the first character of the two or more adjacent characters;
output, by the match and substitution engine an enabled signal for the symbol;
for a second character of the two or more adjacent characters that occurs after the first character of the two or more adjacent characters in the stream of characters:
output the second character; and
output a disabled signal for the second character;
process, by the non-deterministic finite automaton (NFA) states:
the symbol as a replacement of the first character in the two or more adjacent characters in the stream of characters as indicated by the enabled signal; and
the second character of the two or more adjacent characters in the stream of characters as a no-op according to the disabled signal output from the match and substitution engine; and
provide, by the final acceptor, a match signal that indicates whether the stream of characters matches the regular expression based on respective outputs of the NFA states.

15. The system of claim 14, wherein the controller is further configured to program a rule for the match and substitution engine that is compared with the stream of characters to recognize the two or more adjacent characters to replace with the symbol.

16. The system of claim 14,
wherein the regular expression filter further comprises a replication engine, configured to:
decode the symbol to identify a counter for the symbol in an array of counters;
increment the counter identified for the symbol to count a number of times that the symbol in the stream of characters is repeated; and
encode the symbol to indicate that the number of times that the symbol is repeated is within a range specified in the regular expression; and
wherein the processing, by the NFA states, is further based on the indication that the number of times the symbol is repeated is within the range specified in the regular expression.

17. The system of claim 14, wherein the symbol comprises one or more bits in addition to a plurality of bits comprising a character value.

18. The system of claim 14, wherein the regular expression includes an alternation and wherein the NFA states are grouped in one or more islands.

19. The system of claim 18, wherein an output signal from one of the one or more islands is an island start signal to another one of the one or more islands of at least one of the one or more NFA states.

20. The system of claim 14, wherein the system is implemented as part of a service offered by a provider network that performs a search for data matching the regular expression in response to a request received at the service.

* * * * *